(12) United States Patent
Graves

(10) Patent No.: US 11,934,191 B2
(45) Date of Patent: Mar. 19, 2024

(54) METHOD AND SYSTEM FOR PREDICTIVE CONTROL OF VEHICLE USING DIGITAL IMAGES

(71) Applicant: Daniel Mark Graves, Edmonton (CA)

(72) Inventor: Daniel Mark Graves, Edmonton (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/921,523

(22) Filed: Jul. 6, 2020

(65) Prior Publication Data

US 2021/0004006 A1    Jan. 7, 2021

Related U.S. Application Data

(60) Provisional application No. 62/870,983, filed on Jul. 5, 2019.

(51) Int. Cl.
   *B60W 30/12*     (2020.01)
   *B60W 30/095*    (2012.01)
   (Continued)

(52) U.S. Cl.
   CPC ......... *G05D 1/021* (2013.01); *B60W 30/0956* (2013.01); *B60W 50/0097* (2013.01)

(58) Field of Classification Search
   CPC .............. G05D 1/021; B60W 50/0097; B60W 30/0956; B60W 2710/207; B60W 2720/10; B60W 2520/10; B60W 30/12; H04W 52/0225; H04W 4/029; H04W 52/322; H04W 88/06; H04W 52/0229; H04W 52/0219; H04W 4/027; H04W 4/185; H04W 4/70; H04W 4/80; H04W 52/0235; H04W 52/0241; H04W 52/0251; H04W 52/0254; H04W 52/028; H04W 52/267;
   (Continued)

(56) References Cited

U.S. PATENT DOCUMENTS 10,379,538 B1 *   8/2019   Sheckells ............ B60W 40/072
11,014,579 B2 *   5/2021   Lim ....................... B60W 50/14
(Continued)

FOREIGN PATENT DOCUMENTS

CN    101162395 B    6/2010
CN    104627177 A    5/2015
(Continued)

OTHER PUBLICATIONS

R. Sutton, J. Modayil, M. Delp, T. Degris, P. Pilarski, A. White and D. Precup, "Horde: A scalable real-time architecture for learning knowledge from unsupervised sensorimotor interaction," in Proc. of 10th Intl. Conf. on Autonomous Agents and Multiagent Systems, Taipei, Taiwan, 2011. (Year: 2011).*

(Continued)

*Primary Examiner* — Donald J Wallace
*Assistant Examiner* — Daniel M. Robert

(57) ABSTRACT

Methods and systems for predictive control of an autonomous vehicle are described. Predictions of lane centeredness and road angle are generated based on data collected by sensors on the autonomous vehicle and are combined to determine a state of the vehicle that are then used to generate vehicle actions for steering control and speed control of the autonomous vehicle.

20 Claims, 8 Drawing Sheets

(51) Int. Cl.
*B60W 50/00* (2006.01)
*G05D 1/00* (2006.01)
*G05D 1/02* (2020.01)

(58) Field of Classification Search
CPC . H04W 52/283; H04W 52/343; H04W 4/025; H04W 52/0209; H04W 52/0248; H04W 52/0261; G06F 1/28; G06F 1/3287; G06F 1/3296; H04B 1/005; H04B 1/406; H04B 1/59; H04B 1/401; Y02D 30/70; G06K 19/0701
See application file for complete search history.

(56) References Cited

U.S. PATENT DOCUMENTS

| | | | | |
|---|---|---|---|---|
| 2008/0091318 | A1* | 4/2008 | Deng | B62D 6/003 701/41 |
| 2008/0312832 | A1* | 12/2008 | Greene | G08G 1/166 701/301 |
| 2011/0046843 | A1* | 2/2011 | Caveney | G08G 1/161 701/31.4 |
| 2015/0134218 | A1* | 5/2015 | Ishida | B60W 30/12 701/70 |
| 2016/0107682 | A1* | 4/2016 | Tan | G05D 1/0212 701/41 |
| 2016/0325753 | A1* | 11/2016 | Stein | G05D 1/0251 |
| 2016/0332516 | A1* | 11/2016 | Kuehnle | H04N 7/183 |
| 2017/0006759 | A1* | 1/2017 | Adamchuk | G05D 1/0246 |
| 2017/0148327 | A1* | 5/2017 | Sim | G08G 1/167 |
| 2017/0154529 | A1* | 6/2017 | Zhao | G08G 1/07 |
| 2017/0233001 | A1* | 8/2017 | Moshchuk | B62D 15/025 701/42 |
| 2017/0259801 | A1* | 9/2017 | Abou-Nasr | B60W 10/20 |
| 2017/0330461 | A1* | 11/2017 | Caveney | G08G 1/052 |
| 2019/0073540 | A1* | 3/2019 | Yamada | G08G 1/167 |
| 2019/0086929 | A1* | 3/2019 | Tamboli | B60W 30/00 |
| 2019/0152490 | A1* | 5/2019 | Lan | G08G 1/166 |
| 2019/0179328 | A1* | 6/2019 | Movert | G06F 16/29 |
| 2019/0329772 | A1* | 10/2019 | Graves | B60W 30/0956 |
| 2020/0110416 | A1* | 4/2020 | Hong | G01C 21/3602 |
| 2020/0142417 | A1* | 5/2020 | Hudecek | B60W 30/0953 |
| 2020/0189590 | A1* | 6/2020 | Luo | G06N 3/088 |
| 2020/0307563 | A1* | 10/2020 | Ghafarianzadeh | G06V 40/25 |
| 2020/0346642 | A1* | 11/2020 | Varunjikar | G08G 1/167 |

FOREIGN PATENT DOCUMENTS

| | | |
|---|---|---|
| CN | 107451539 A | 12/2017 |
| CN | 108327717 A | 7/2018 |
| JP | 4797284 B2 | 10/2011 |

OTHER PUBLICATIONS

Graves D, Günther J, Luo J. Affordance as general value function: a computational model. Adaptive Behavior. 2022;30(4):307-327, doi:10.1177/1059712321999421 (Year: 2022).*

S. Magdici and M. Althoff, "Adaptive Cruise Control with Safety Guarantees for Autonomous Vehicles," in Proc. World Congress Intl. Fed. Of Autonomatic Control 2017.

D. Silver, A. Huang, C. Maddison, A. Guez, L. Sifre, G. Driessche, J. Schrittwieser, I. Antonoglou and V. Panneershelvam, "Mastering the game of Go with deep neural networks and tree search," Nature, vol. 529, No. 7587, pp. 484-489 2016.

R. Sutton, J. Modayil, M. Delp, T. Degris, P. Pilarski, A. White and D. Precup, "Horde: A scalable real-time architecture for learning knowledge from unsupervised sensorimotor interaction," in Proc. of 10th Intl. COnf. on Autonomous Agents and Multiagent Systems, Taipei, Taiwan 2011.

D. Moser, R. Schmied, H. Waschl and L. d. Re, "Flexible spacing adaptive cruise control using stochastic model predictive control," IEEE Transactions on Control Systems Technology, vol. PP, No. 99, pp. 1-14, 2017 2017.

D. Zhao, B. Wang and D. Liu, "A supervised actor-critic approach for adaptive cruise control," Soft Computing, vol. 17, pp. 2089-2099 2013.

D. Moser, L. d. Re and S. Jones, "A risk constrained control approach for adaptive cruise control," in IEEE Conf. on Control Technology and Applications, Kohala Coast, Hawai'i, USA, 2017 2017.

M. C. G. d. Silva, "Measurements of comfort in vehicles," Measurement Science and Technology, vol. 13 2002.

E. F. Camacho and C. Bordons, Model Predictive Control, Springer 2007.

D. Silver, G. Lever, N. Heess, T. Degris, W. Daan and M. Riedmiller, "Deterministic Policy Gradient Algorithms," in Proc. Int. Conf. on International Conference on Machine Learning, Beijing, China 2014.

M. Bojarski, D. D. Testa, D. Dworakowski, B. Firner, B. Flepp, P. Goyal, L. Jackel, M. Monfort, U. Muller, J. Zhang, X. Zhang, J. Zhao and K. Zieba, "End to end learning for self-driving cars," 2016.

* cited by examiner

METHOD AND SYSTEM FOR PREDICTIVE CONTROL OF VEHICLE USING DIGITAL IMAGES

CROSS-REFERENCE TO RELATED APPLICATIONS

The present disclosure claims priority to U.S. provisional patent application No. 62/870,983, entitled "METHOD AND SYSTEM FOR PREDICTIVE CONTROL OF VEHICLE USING DIGITAL IMAGES", filed Jul. 5, 2019, the entirety of which is hereby incorporated by reference.

TECHNICAL FIELD

The present disclosure relates to methods and systems for providing predictive control using digital images as input, and is applicable to control of vehicles including autonomous vehicles.

BACKGROUND

An autonomous vehicle may have different sensors (e.g., sonar range finder, radar, LIDAR and/or camera, among others) which collect information about an environment surrounding the autonomous vehicle while the autonomous vehicle is operating in the environment. Information collected by the sensors is provided as sensor data to an automated driving system (ADS) of the autonomous vehicle and used for path planning and navigation of the autonomous device. Including more sensors and more high-quality sensors in the autonomous device may enable the ADS of the autonomous vehicle to better control operation of the autonomous device in the environment. However, in practice it may be too costly to include a large number of different types of sensors on the autonomous vehicle and/or it may be too processor-intensive to process sensor data received from a large number of sensors. Accordingly, there is interest in developing methods for controlling operation of an autonomous device using digital images of the surrounding environment of the autonomous device as the autonomous vehicle operates in the environment.

One method that has been developed for controlling operation of an autonomous vehicle involves controlling steering of the autonomous device. Performing steering control or steering and speed control, using digital images only, has been a difficult problem. For example, it is a challenge for an autonomous device to steer around a sharp corner, where travelling too fast may make it unsafe or impossible to steer the vehicle around the corner. Most conventional methods for performing steering control using digital images fall into three categories: (a) end-to-end steering mapping digital images of the surrounding environment of the autonomous vehicle directly to control action, (b) intermediate mapping of the digital images to a few highly relevant features that can be used to generate steering control; and (c) parsing the digital images in order to generate steering control. The first approach tends to fail because recovery from bad positions (e.g., severely off-lane) tends to be difficult. The second approach may be promising but a challenge remains in how to determine which features that are used to describe a surrounding environment should be use for generating steering control. The third approach typically relies on detection of lane markings, but such detection can be difficult due to, for example, road diversity, weather conditions, faded and/or damaged lane markings, or lack of a pre-built map.

For the foregoing and other reasons, it would be useful to provide improvements in techniques for generating steering control using digital images.

SUMMARY

The present disclosure describes methods for predictive control of an autonomous vehicle. Predictions are generated for a plurality of time horizons, which enables generation of smoother steering and speed control for the vehicle.

In various example aspects, the present disclosure describes a method for predictive control of an autonomous vehicle. The method includes: receiving sensor data representing an environment of the autonomous vehicle and vehicle data representing speed of the vehicle; determining a current state of the autonomous vehicle based on the sensor data and the vehicle data; generating predictions including a first set of predictions and a second set of predictions, the first set of predictions representing future lane centeredness of the vehicle over respective time horizons, the second set of predictions representing future road angle of the vehicle over the same or different respective time horizons; and generating, based on the first and second sets of predictions, a vehicle action.

In any of the above example aspects, each lane centeredness predictor in the set of lane centeredness predictors implements a lane centeredness general value function (GVF) and each road angle predictor in the set of road angle predictors implements a road angle GVF.

In any of the above aspects, learning the lane centeredness GVFs and the road angle GVFs may include generating the predictions including the first set of predictions by the set of lane centeredness predictors based on the current state at a current time step and generating the second set of predictions by the set of road angle predictors based on the current state at the current time step, generating the vehicle action based on the predictions. Learning the lane centeredness GVFs and the road angle GVFs may also include executing the vehicle action and sampling a next state at a next time step, computing a cumulant based on the current state, the executed vehicle action and the next state, and updating the lane centeredness GVFs implemented by the set of lane centeredness predictors and the road angle GVFs implemented by the set of road angle predictors based on the cumulant.

In any of the above example aspects, learning the lane centeredness GVFs and the road angle GVFs may include: receiving a dataset containing vehicle actions, sensor data, and vehicle data at respective time steps; constructing a state at each respective time step using the sensor data and vehicle data at each respective time step; and updating the lane centeredness GVFs and the road angle GVFs based on cumulants computed using the vehicle action and state at each respective time step.

In any of the above example aspects, the generated vehicle action is one of a steering control action to change a steering angle of the vehicle, a speed control action to change a target speed of the vehicle, and a steering and speed control action to change both a steering angle and a target speed of the vehicle.

In any of the above example aspects, the vehicle action may be generated by a predefined proportional-integral-derivative (PID) controller.

In any of the above examples, the vehicle action may be generated by a controller that is learned using RL.

In any of the above examples, wherein the lane centeredness GVFs and the road angle GVFs may be implemented by a single neural network.

In some example aspects, the present disclosure describes a vehicle control system for controlling an autonomous vehicle. The vehicle control system includes a processor system configured to execute instructions of a predictive control system to cause the predictive control system to perform the steps of any of the methods described above.

In some example aspects, the present disclosure describes a computer-readable medium containing computer-executable instructions that, when executed by a predictive vehicle control system, cause the predictive vehicle control system to perform the steps of any of the methods described above.

DESCRIPTION OF EXAMPLE EMBODIMENTS

Figure 1:
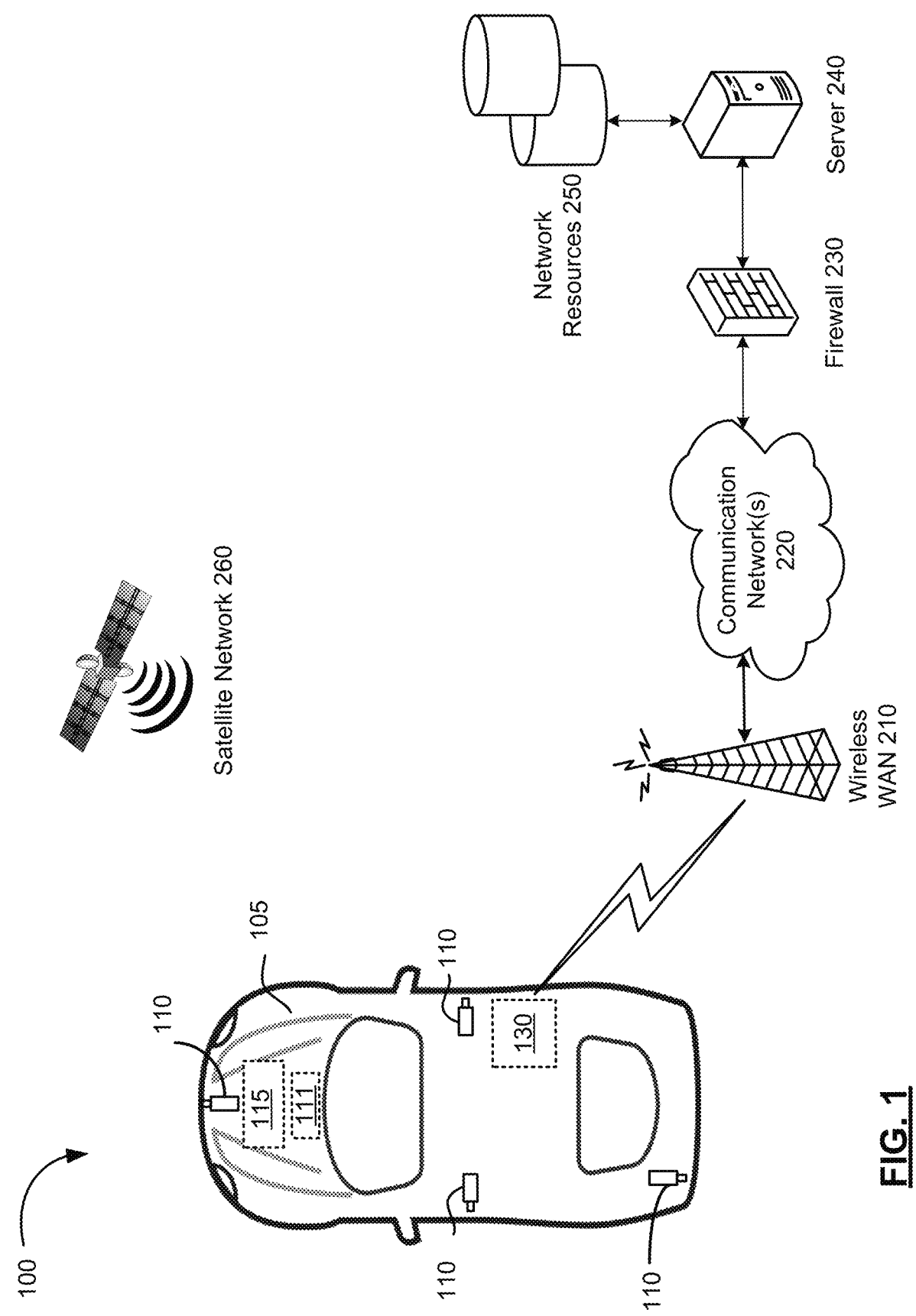
FIG. 1 is a schematic diagram of a communication system suitable for practicing example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

Some examples of the present disclosure are described in the context of autonomous vehicles. However, the methods and systems disclosed herein may also be suitable for implementation outside of autonomous vehicles, for example in non-vehicular autonomous, semi-autonomous devices, and non-autonomous devices (e.g., for implementing warning systems or driver assist systems in human-controlled devices). For example, any system or device that requires steering control may benefit from the examples described here. Further, examples of the present disclosure may be implemented in simulators, workstations, or other systems outside of actual deployment in a moving device.

Although examples described herein refer to a car as the autonomous vehicle, the teachings of the present disclosure may be implemented in other forms of autonomous or semi-autonomous vehicles including, for example, trams, subways, trucks, buses, watercraft, aircraft, ships, drones (also called unmanned aerial vehicles (UAVs)), warehouse equipment, construction equipment or farm equipment, and may include vehicles that do not carry passengers as well as vehicles that do carry passengers. The methods and systems disclosed herein may also be suitable for implementation in non-vehicular devices, for example autonomous vacuum cleaners and lawn mowers.

The present disclosure refers, in some examples, to learning-based systems that include neural networks. It should be understood that any learning-based system may be used in place of the neural network.

In at least some examples, predictive functions used to make predictions are trained via reinforcement learning (RL) using the general value function (GVF) framework. An example of a GVF framework that can be implemented in example embodiments is described in: "R. Sutton, J. Modayil, M. Delp, T. Degris, P. Pilarski, A. White and D. Precup, "Horde: A scalable real-time architecture for learning knowledge from unsupervised sensorimotor interaction," in Proc. of 10th Intl. Conf. on Autonomous Agents and Multiagent Systems, Taipei, Taiwan, 2011." Reinforcement learning enables a way of dealing with the stochastic and unknown behavior of other vehicles by learning from experience, including observing changes in behavior of other vehicles and the impact that has on safety. An example of RL is described in: D. Silver, G. Lever, N. Heess, T. Degris, W. Daan and M. Riedmiller, "Deterministic Policy Gradient Algorithms," in Proc. Int. Conf. on International Conference on Machine Learning, Beijing, China, 2014.

A predictive question that may be addressed, when generating steering control, is that of what the lane centeredness will be if the current steering angle is kept unchanged. Alternatively (or additionally), the predictive question may be that of what the road angle will be (with respect to the road direction) if the current steering angle is kept unchanged. Providing such predictions for different temporal horizons may enable an automated driving system (ADS) of the vehicle to infer the shape of the road curvature ahead, in order to anticipate sharp corners for example. In the present disclosure, an ADS (also referred to as an autonomous driving agent (ADA), driver-assistance system, or advanced driver-assistance system (ADAS)) may be a software system that is used to generate control signals for controlling driving actions of a vehicle. The ADS may be used to control a vehicle for autonomous operation, to assist control of the vehicle for semi-autonomous operation, and/ or to provide driver assistance (e.g., lane departure warning) during non-autonomous operation of the vehicle, among other possible applications.

The present disclosure describes examples of training and deploying (or testing) a set of predictors that may be used to generate a set of predictions that are used to generate a vehicle action. A vehicle action may be a vehicle action for steering control (referred to hereinafter as a steering control action), a vehicle action for speed control (referred to hereinafter as a speed control action), and a vehicle action for steering and speed control (referred to as a steering and speed control action), based on a current state of the vehicle which includes current and past digital images of the surrounding environment, and a most recent (e.g. last) vehicle action. A steering control action may be for changing a steering angle of the vehicle. A speed control action may be for changing a target speed of the vehicle. A steering and speed control action may be for changing both a steering angle and a target speed of the vehicle. In the present disclosure, digital images of the surrounding environment of the vehicle may be captured by any suitable camera, such as an optical camera, and used to determine a current state of the vehicle and generate the set of predictions that are used to generate the vehicle action. Digital images may include, for example, bitmap images, pixel images, color images, and grayscale images, and may be in any suitable format. In some example embodiments, digital images may also be referred to as image data. Some low dimensional data, namely data representing the vehicle's lane centeredness and data representing the vehicle's road angle (defined with respect to the road direction), are used during training only, but in deployment only vehicle data indicative of the current speed of the vehicle and the digital images is required to generate predictions of future lane centeredness. The set of predictors are trained to learn to generate one or more predictions of future lane centeredness and one or more predictions of road angle. The use of low dimensional data may enable a controller (e.g., a steering and speed controller) to learn to generate vehicle actions more quickly.

Examples described herein may be implemented using GVFs to predict lane centeredness and road angle; online or offline off-policy learning to train the predictors; characterization of the behavior policy to enable off-policy learning; and deterministic policy gradient (DPG) or deep DPG (DDPG) to learn to generate steering control (and optionally speed control) using the predictions generated by the predictors. These implementation details are exemplary and are not intended to be limiting.

The disclosed methods and systems may be used in real-world applications, for example by making use of off-policy learning and characterization of the behavior policy to learn to predict lane centeredness and road angle using real digital images captured by the camera of the vehicle when a human driver is operating the vehicle and doing "safe" exploration. Then a controller (e.g., a proportional-integral-derivative (PID) controller, a learned controller, or other controller) can be devised through, for example, manual tuning to steer the vehicle.

Figure 2:
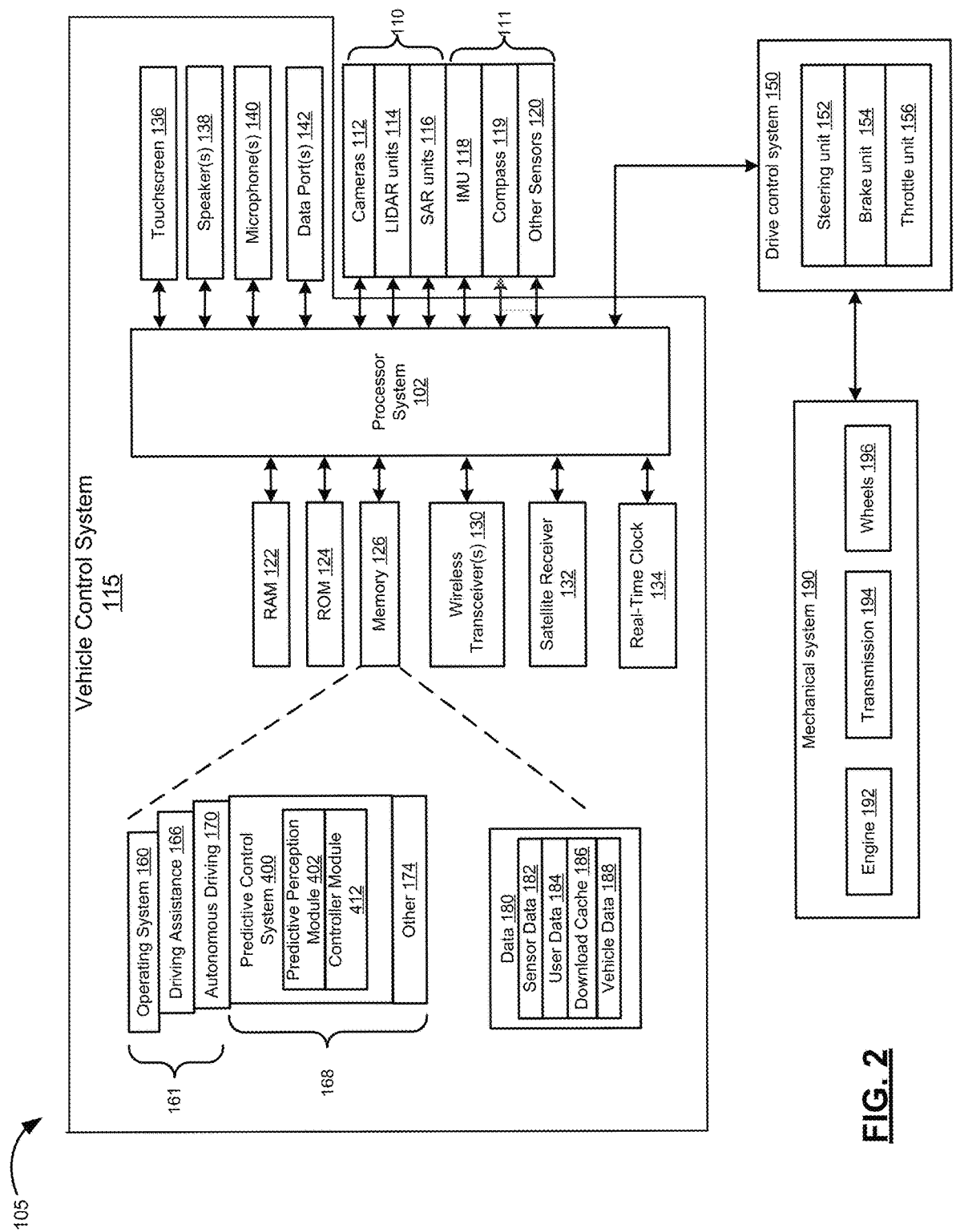
FIG. 2 is a block diagram of a vehicle comprising a vehicle control system in accordance with one example embodiment of the present disclosure.

FIGS. 1 and 2 are now described. FIG. 1 is a schematic diagram showing selected components of a system 100 in accordance with an example embodiment of the present disclosure. The system 100 includes user equipment in the form of a vehicle control system 115 embedded in vehicles 105 (only one of which is shown in FIG. 1). The vehicle control system 115, shown in greater detail in FIG. 2, is coupled to a drive control system 150 and a mechanical system 190 of the vehicle 105, as described below. The vehicle control system 115 may, in various embodiments, enable the vehicle 105 to be operable in one or more of a fully-autonomous, semi-autonomous or fully user-controlled mode.

The vehicle 105 includes a one or more environment sensors 110 that collect information about the external environment surrounding vehicle 105, and a plurality of vehicle sensors 111 that collect information about the operating conditions of the vehicle 105. Environment sensors 110 may, for example, include one or more digital cameras 112, one or more light detection and ranging (LIDAR) units 114, and one or more radar units such as synthetic aperture radar (SAR) units 116. Cameras 112, LIDAR units 114 and SAR units 116 may be located about the vehicle 105 and are each coupled to the vehicle control system 115, as described below. In an example embodiment, the cameras 112, LIDAR units 114 and SAR units 116 are located at the front, rear, left side and right side of the vehicle 105 to capture information about the environment in front, rear, left side and right side of the vehicle 105. The cameras 112, LIDAR units 114 and SAR units 116 are mounted or otherwise located to have different fields of view (FOVs) or coverage areas to capture information about the environment surrounding the vehicle 105. In some examples, the FOVs or coverage areas of some or all of the adjacent EM wave-based sensors 110 are partially overlapping. Accordingly, the vehicle control system 115 receives information about the external environment of the vehicle 105 as collected by cameras 112, LIDAR units 114 and SAR units 116. In at least some examples, the coverage areas are divided into zones, including for example a front zone, a back zone, and side zones.

Vehicle sensors 111 can include an inertial measurement unit (IMU) 118, an electronic compass 119, and other sensors 120 such as a speedometer, a tachometer, wheel traction sensor, transmission gear sensor, throttle and brake position sensors, steering angle sensor, tire pressure sensors (TPSs), door contact switches, light sensors, proximity sensors, among other possibilities. The vehicle sensors 111, when active, repeatedly (e.g., in regular intervals) sense information and provide the sensed information to the vehicle control system 115 in real-time or near real-time. The vehicle sensors 111 can include an IMU 118 that senses the vehicle's specific force and angular rate using a combination of accelerometers and gyroscopes. The vehicle control system 115 may collect information about a position and orientation of the vehicle 105 using signals received from a satellite receiver 132 and the IMU 118. The vehicle control system 115 may determine a linear speed, angular speed, acceleration, engine RPMs, transmission gear and tire grip of the vehicle 105, among other factors, using information from one or more of the satellite receivers 132, the IMU 118, and the vehicle sensors 111.

The vehicle control system 115 may also include one or more wireless transceivers 130 that enable the vehicle control system 115 to exchange data and optionally voice communications with a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 is connected to network resources 250, such as supplemental data sources that may be used by the vehicle control system 115.

The communication system 100 includes a satellite network 260 having a plurality of satellites, in addition to the WAN 210. The vehicle control system 115 includes the satellite receiver 132 (FIG. 2) that may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Sa [39] Further details of FIG. 2 are now described. FIG. 2 illustrates selected components of the vehicle 105 in accordance with an example embodiment of the present disclosure. As noted above, the vehicle 105 includes a vehicle control system 115 that is connected to a drive control system 150 and a mechanical system 190 as well as to the environment sensors 110 and vehicle sensors 111. The vehicle 105 also includes various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor 102. The processor system 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with the wireless network 210, the satellite receiver 132 for receiving satellite signals from the satellite network 260, a real-time clock 134, and a touchscreen 136. The processor system 102 may include one or more processing units, including for example one or more central processing units (CPUs), one or more graphical processing units (GPUs) and other processing units.

The one or more wireless transceivers 130 may include one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The wireless transceiver(s) 130 may send and receive signals over the wireless WAN 210. The one or more wireless transceivers 130 may include a multi-band cellular transceiver that supports multiple radio frequency bands.

The wireless transceiver(s) 130 may also include a wireless local area network (WLAN) transceiver for communicating with a WLAN (not shown) via a WLAN access point (AP). The WLAN may include a Wi-Fi wireless network which conforms to IEEE 802.11x standards (sometimes referred to as Wi-Fi®) or other communication protocol.

The wireless transceiver(s) 130 may also include a short-range wireless transceiver, such as a Bluetooth® transceiver, for communicating with a mobile computing device (not shown), such as a smartphone or tablet. The wireless transceiver(s) 130 may also include other short-range wireless transceivers including but not limited to Near field communication (NFC), IEEE 802.15.3a (also referred to as Ultra-Wideband (UWB)), Z-Wave, ZigBee, ANT/ANT+ or infrared (e.g., Infrared Data Association (IrDA) communication).

The real-time clock 134 may include a crystal oscillator that provides accurate real-time time information. The time information may be periodically adjusted based on time information received through satellite receiver 132 or based on time information received from network resources 250 executing a network time protocol.

The touchscreen 136 may include a display such as a color liquid crystal display (LCD), light-emitting diode (LED) display or active-matrix organic light-emitting diode (AMO-LED) display, with a touch-sensitive input surface or overlay connected to an electronic controller. Additional input devices (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports).

The drive control system 150 serves to control movement of the vehicle 105. The drive control system 150 includes a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, receives navigation instructions from an autonomous driving system 170 (for autonomous driving mode) or a driving assistance system 166 (for semi-autonomous driving mode) and generates control signals to control one or more of the steering, braking and throttle of the vehicle 105. The drive control system 150 may include additional components to control other aspects of the vehicle 105 including, for example, control of turn signals and brake lights.

The mechanical system 190 receives control signals from the drive control system 150 to operate the mechanical components of the vehicle 105. The mechanical system 190 effects physical operation of the vehicle 105. The mechanical system 190 includes an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 may be rendered and displayed on the touchscreen 136 by the processor 102. A user may interact with the GUI using the touchscreen and optionally other input devices (e.g., buttons, dials) to select a driving mode for the vehicle 105 (e.g. fully autonomous driving mode or semi-autonomous driving mode) and to display relevant information, such as navigation information, driving information, parking information, media player information, climate control information, etc. The GUI may include a series of traversable content-specific menus.

The memory 126 of the vehicle control system 115 has stored thereon a number of software systems 161 in addition to the GUI, where each software system 161 includes instructions that may be executed by the processor 102. The software systems 161 includes an operating system 160, the driving assistance software system 166 for semi-autonomous driving, and the autonomous driving software system 170 for fully autonomous driving. Both the driving assistance software system 166 and the autonomous driving software system 170 can include one or more of a navigation planning and control module, a vehicle localization module, parking assistance module, and autonomous parking module. The memory 126 also has stored thereon other software systems 168 that can be invoked by either the driving assistance software system 166 or the autonomous driving software system 170. The other software systems 168 include a predictive control system 400 that includes a predictive perception module 402 and a controller 412 (which may be a steering controller, or a steering and speed controller), which is discussed further below. The other software systems 168 may include other software modules 174. Other software modules 174 may include, for example, a mapping module, a climate control module, a media player module, a telephone module and a messaging module, among other possibilities. The predictive perception module 402 and the controller 412 include machine readable instructions, when executed by the processor 102, causes the operations of methods described herein to be performed.

Although the predictive control system 400 is shown as a separate software system that can be invoked by the driving assistance software system 166 for semi-autonomous driving and/or the autonomous driving software system 170, one or more of the other modules 168, including the predictive perception module 402 and the controller 412, may be combined with one or more of the other software modules 174 in some embodiments.

The memory 126 also stores a variety of data 180. The data 180 may include sensor data 182 received from the environment sensors 110 and vehicle information, the vehicle information, user data 184 comprising user preferences, settings and optionally personal media files (e.g., music, videos, directions, etc.), a download cache 186 comprising data downloaded via the wireless transceivers 130, including for example data downloaded from network resources 250, and vehicle data 188 include the linear speed, acceleration, engine RPMs, transmission gear and tire grip of the vehicle 105 of the vehicle 105. The sensor data 182 may include digital images from the cameras 112, LIDAR data from the LIDAR units 114, RADAR data from the SAR units 116. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

The vehicle 105 that is controlled by the vehicle control system 115 may also be referred to as the ego vehicle. In the present disclosure, the state of the vehicle 105 refers to a representation of the environment and the vehicle 105 within that environment, which may be generated from the sensor data received from the environment sensors 110 and the vehicle sensor 111. A vehicle action, or a control action, in the present disclosure, refers to a control decision, which may be provided to the drive control system 150, and which may be implemented by the electromechanical system 190, for causing the vehicle 105 to interact with the environment (e.g., perform steering, increase speed of the vehicle 105, or decrease speed of the vehicle 105).

As previously mentioned, methods and systems disclosed herein enable steering control, speed control, or steering and speed control, based on a current state of the vehicle 105. By predicting future values of certain features (angle with the road and lane centeredness), a predictive perception module may be trained to generate a predictive state representation (e.g., a predictive state vector) that may be used to map to vehicle action using traditional controllers (such as a PID controller), or that may be used for generating control signals using a learned controller. Generating predictive feature representations may provide advantages not commonly addressed by conventional steering and speed controllers. For example, the use of predictive information may enable the vehicle 105 to be controlled in such a way as to slow down (i.e. decrease its speed) for upcoming sharp corners, to prevent or reduce the amount of lane departure; and may also enable the vehicle 105 to be controlled in such a way as to more comfortably steer around tighter turns by anticipating the upcoming turn rather than reacting to the turn.

After training the system disclosed herein, the predictive perception module can be used, together with a controller, to generate steering control action from digital images (e.g., digital images from a front-facing camera mounted to a vehicle) and the vehicle data 182 (e.g. linear speed, acceleration, engine RPMs, transmission gear) generated from information received from basic vehicle sensors only. In some example embodiments, the controller may also be used to generate speed control action, or a steering and speed control action, as discussed herein. In the present disclosure, basic vehicle sensors may refer to the vehicle sensors 111 that are commonly found in most conventional vehicles (including most conventional non-autonomous vehicles). Basic vehicle sensors include, for example, accelerometer, gyroscope, and speed sensor, and exclude higher quality or higher resolution sensors such as high accuracy GPS sensors, LIDAR sensors, DAR sensors etc. The controller can be deployed without requiring input from potentially costly sensors (e.g., a very accurate GPS sensor), without requiring detailed external data (e.g., a high definition map), and without relying on potentially unreliable lane marking detection. Examples disclosed herein may be applied to the real-world by, for example, training the set of predictors of a predictive perception module off-policy using human-collected data (e.g., sensor data and vehicle data collected when a human driver is able to explore the lane safely when driving the vehicle) such that the precise policy used by the human driver is not critical to the learning. Off-policy learning means that the set of predictors of the predictive perception module are trained to predict the outcome of future variables in the environment (e.g. lane centeredness and road angles expected to be observed if the vehicle 105 executed a target policy different from the behavior policy used to collect the human-collected data (e.g. by a human driver)). The present disclosure may help to improve safe operation of the vehicle 105 by the ADS when the ADS is steering the vehicle 105 from digital images only.

The controller (discussed further below) may be a controller that was learned using RL, a controller that was learned using batch RL, or classical (e.g., PID) controller, for example. The predictive perception module includes a set of predictors, including one or more predictors of lane centeredness and one or more predictors of road angle. Each predictor of the predictive perception module may implement a GVF whose parameters are learned via RL. By implementing each predictor as a GVF, the predictive perception module may generate more accurate, longer-term predictions of the vehicle's lane centeredness and the vehicle's road angle respectively. The present disclosure provides solutions to at least the problems of: steering a vehicle to stay in the lane; and slowing down (i.e. reducing the speed of the vehicle) when necessary for sharp corners.

Figure 3:
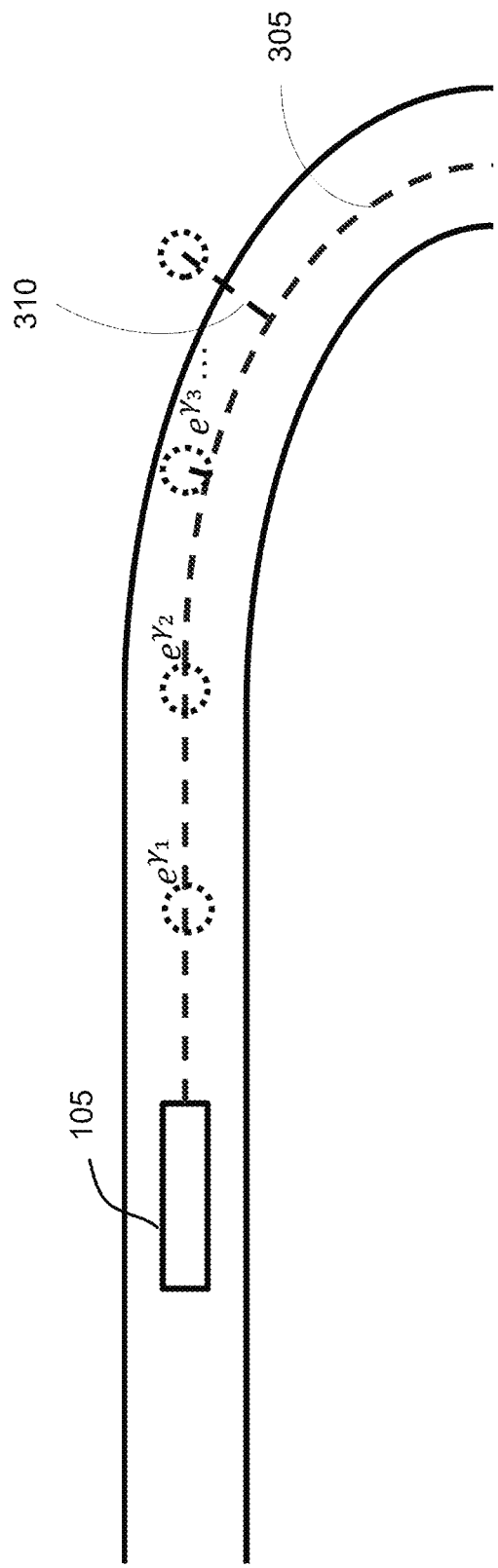
FIG. 3 illustrates predictions of deviation from a desired vehicle trajectory at different time horizons, representing predicted road curvature.

In examples described herein, a predictive representation of a road is based on error at different time horizons. An example is illustrated in FIG. 3. FIG. 3 shows the vehicle 105 traveling along a lane having a curvature. The desired driving policy is for the vehicle 105 to follow the center of the lane (indicated by dashed line 305). Predictions generated by the predictive perception module described herein are used to steer the vehicle at different time horizons $0 \leq \gamma_1 < \gamma_2 << \gamma_n < 1$. These time horizons may be considered to be discount factors, which increase the importance of the future in the predictions with increasing discount factor value. Smaller values for time horizons result in near-term predictions to be emphasized in learning, and larger values for time horizons result in longer-term predictions of the vehicle's lane centeredness and the vehicle's road angle to be emphasized in learning. The predictions can be interpreted as expected deviations or error (indicated by dashed line 310) from the desired trajectory. This presents a compact way to represent the predicted road curvature in front of the vehicle. In this example, τ(a|s) is the target policy of the deviation predictions and π(a|s) is the desired policy for following the lane.

Figure 4:
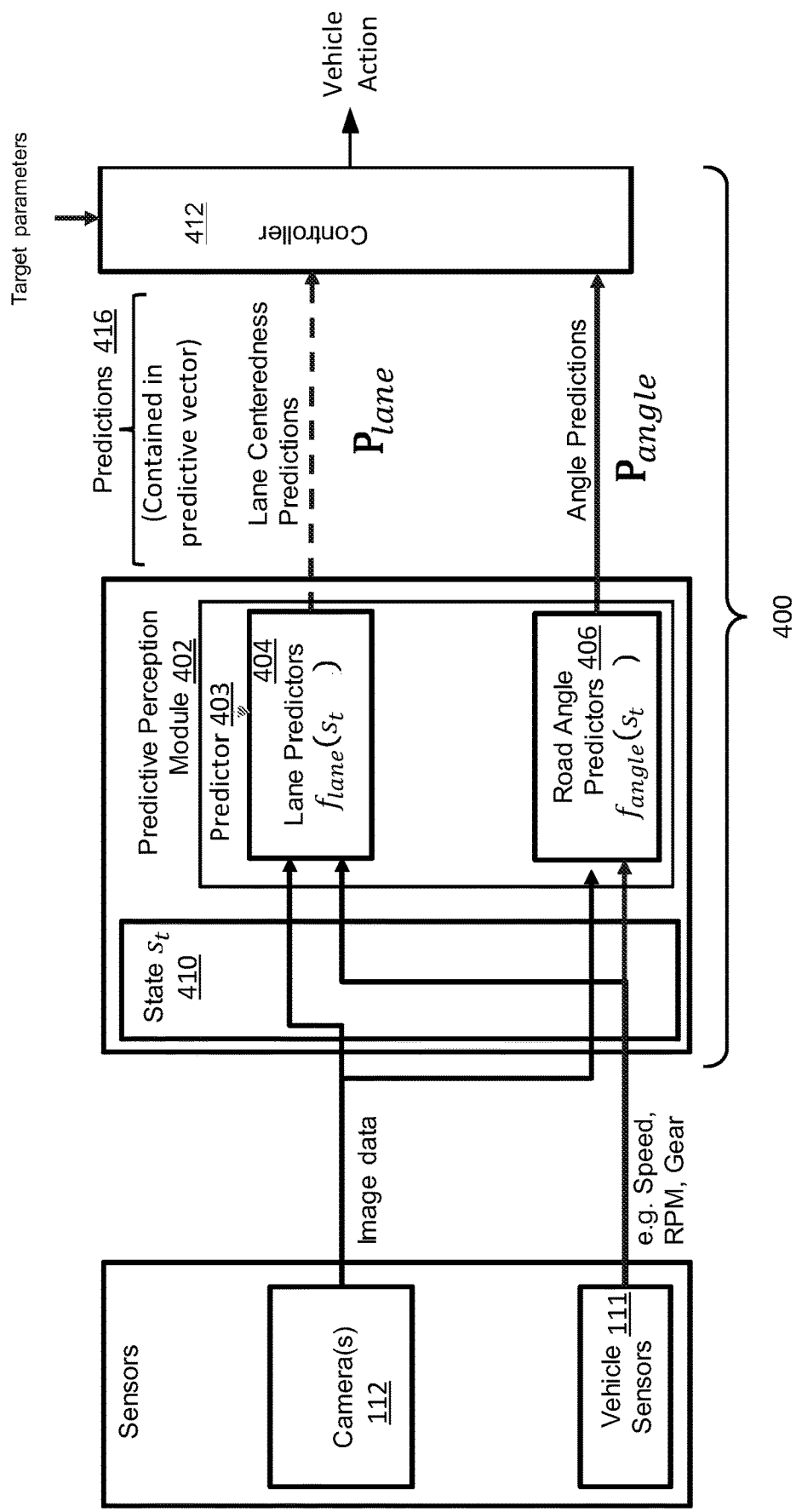
FIG. 4 is a block diagram of a predictive control system according to an example embodiment.

Reference is now made to FIG. 4. The present disclosure describes a predictive control system 400 that includes the predictive perception module 402 and a controller 412. When deployed in a vehicle 105, the predictive control system 400 described herein may be integrated into the autonomous driving system 170, may be integrated into the driving assistance system 166, or may be used as a stand-alone system (e.g., as a warning system).

The predictive control system 400 receives sensor data from the environment sensors 110 (e.g. sensors mounted on the vehicle and the vehicle sensor integrated into the vehicle and vehicle data 188 generated by the vehicle control system 115 as described above, and generates vehicle actions to be executed. The vehicle actions (e.g., steering control action, a speed control action, or a steering and speed control action) may be processed by the vehicle control system 115, and inputted to the drive control system 150. In some embodiments, a steering control action causes a change in vehicle steering and speed control action causes change in vehicle speed.

The predictive perception module 402 generates predictions about the world (e.g., the environment the vehicle 105 is operating in) using sensor data received from the environment sensors 110 (in particular digital images captured by at least a front-viewing camera 112), vehicle data 188 generated using information from vehicle sensors 111, and optionally other data from external data sources (not shown) such as other vehicles located in the environment the vehicle 105 is operating in, or the cloud. Although FIG. 4 shows the camera(s) 112, other environment sensors 110 (such as the LIDAR unit(s) 114 or the SAR unit(s) 116) may be used to provide LIDAR data and SAR data as sensor data 182 as described above. The vehicle sensors 111 may, for example, provide vehicle data such as distance measurements, speed measurements, or other such information.

In example embodiments described herein, the predictions generated by the predictive perception module 402 are not action-conditioned. Rather, the predictions are conditioned only on the target policy. This may help to improve the training of the predictive perception module because less exploration may be required to learn the long term impact of following a target policy, because the determined action will always be from the target policy rather than arbitrary. However, this introduces the need for importance sampling ratios for off-policy learning of a value function. In other examples, the predictions may be action-conditioned (e.g., generating an action from the target policy and providing that as the input to an action-conditioned predictor will reduce an action-conditioned predictor to the predictors described in the present disclosure).

In example embodiments described herein, the predictive control system 400 generates vehicle actions based on sensor data 182 received from environmental sensor, such as current and past digital images of the surrounding environment of the vehicle 105, along with vehicle data 118 generated from information received from some basic on-board vehicle sensors 111. The predictive perception module 402 predicts the lane centeredness and road angle. During training of the predictive control module 402, feedback information for training lane the set of predictors, including the one or more lane centeredness predictors and the one or more road angle predictors may be provided by existing perception systems or using high definition map data, for example, which may be relied upon as "ground truth". Very accurate localization of the vehicle 100 on the road may not be available all the time or may be prohibitively expensive to make continuously available during deployment. As such, the present disclosure may require such high quality data only for training the predictive perception module 402. In deployment (i.e., after training), the predictive control module 402 does not use the feedback information provided by a classical perception system, GPS sensor, or high definition map.

The predictive perception module 402 includes a state sub-module 410 and a predictor sub-module 403. The state sub-module 410 receives digital images from the camera(s) 112 and other vehicle data 188 generated from information received from the vehicle sensors 111, and determines a representation of a current state st of the vehicle 105 and its environment at a current time t. Vehicle data 118 used by the state sub-module 410 to determine a representation of the current state st of the vehicle 105 and its environment at a current time t (referred to hereinafter as current state st) may, for example, include the linear speed of the vehicle 105, engine RPM and transmission gear, among other possibilities. The camera(s) 112 provides digital images of the environment in which the vehicle 105 is operating in at a current time t. The digital images may be processed (e.g., using an image-based classifier) to provide current state information on the drivability of the road surface (e.g. gravel, asphalt, concrete, wet asphalt, snow, ice, etc.). In some embodiments, the state sub-module 410 may receive other data from one or more external data sources (not shown), including for example data about local weather and local road condition reports available in the cloud, or data about other vehicles in the surrounding environment.

The predictor sub-module 403 includes a set of predictors, including one or more lane predictors 404 and one or more road angle predictors 406. The current state $s_t$ determined by the state sub-module 410 is input to the predictor sub-module 403 to generate a set of predictions 416. In the embodiment shown in FIG. 4, each of the one or more lane centeredness predictors 404 is configure to generate a prediction about the lane centeredness of the vehicle 105 and each of the one or more road angle predictors 406 is configured to generate a prediction about the road angle of the vehicle 105 over different time horizons.

Figure 5:
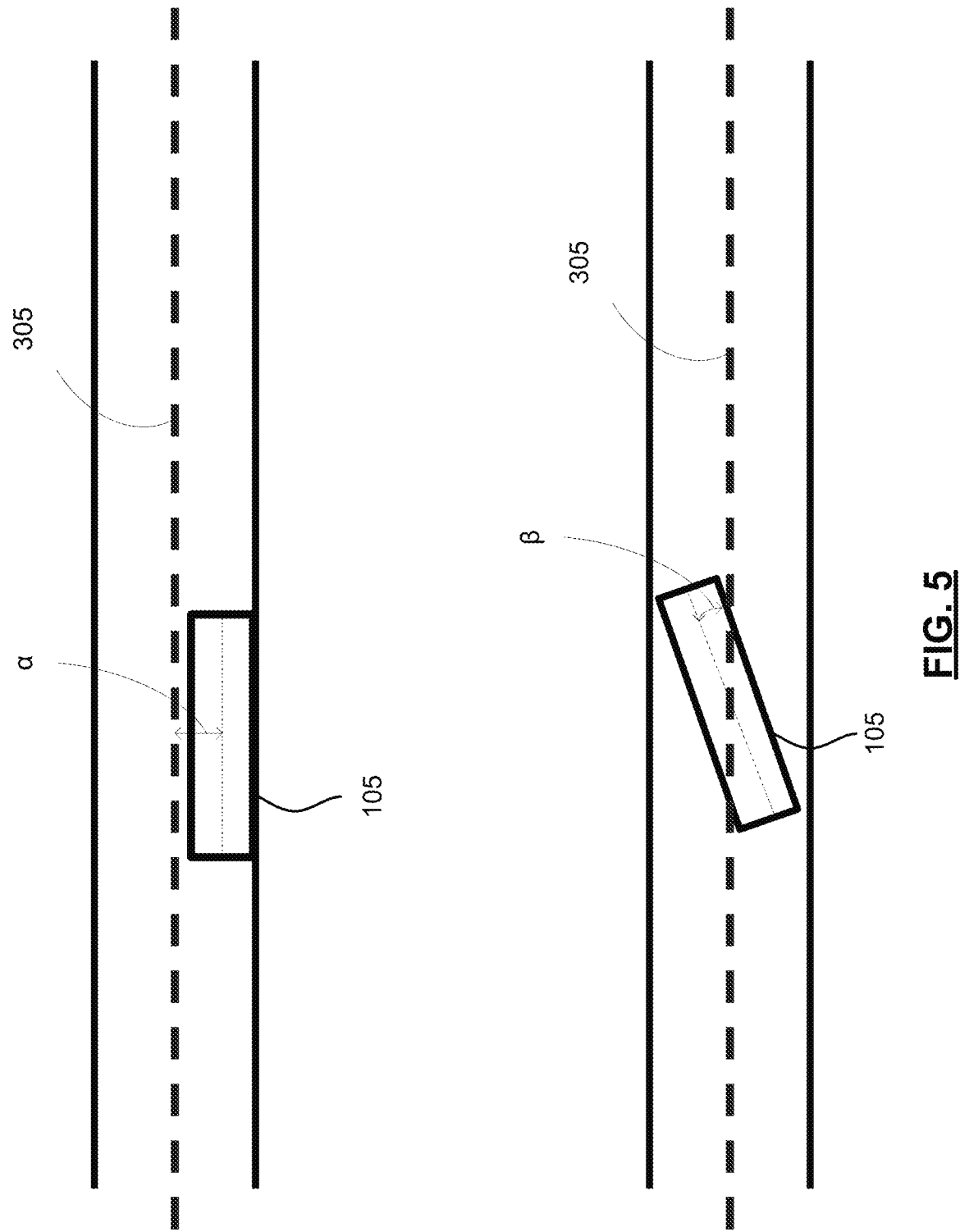
FIG. 5 illustrates the parameters for representing lane centeredness and road angle.

FIG. 5 illustrates the definition of the lane centeredness α and the road angle β, as discussed in the present disclosure. Lane centeredness α is any value in the normalized interval [−1, +1], where 0 denotes the center of the lane (indicated by dashed line 305) and −1 and 1 respectively denote the edges of the lane. It does not matter which side is negative and which side is positive. The value of lane centeredness α is given with reference to the center of the vehicle 105, [65] The road angle is any value in the interval, where 0 denotes the vehicle direction vector is aligned with the road direction vector (indicated by dashed line 305). It does not matter which side is negative and which side is positive. The road angle is given with reference to the direction of the vehicle 105 from center of the vehicle 105 usually (but not necessarily) centered on the rear axle and the angle over the center of the vehicle 105.

The road angle β is any value in the interval [−π, +π], where 0 denotes the vehicle direction vector is aligned with the road direction vector (indicated by dashed line 305). It does not matter which side is negative and which side is positive. The road angle β is given with reference to the direction of the vehicle 105 from center of the vehicle 105 usually (but not necessarily) centered on the rear axle and the angle over the center of the vehicle 105.

Reference is again made to FIG. 4. The predictor sub-module 403 may include a set of predictors, including one or more lane centeredness predictors 404 (generally referred to collectively as a lane centeredness predictors 404 and individually as lane centeredness predictor 404) and one or more road angle predictors 406 (generally referred to collectively as a road angle predictors 406 and individually as road angle predictor 406). Each predictor of the set of predictors (i.e. each lane centeredness predictor 404 and each road angle predictor 406) implements a general value function (GVF). In some embodiments, the GVF implemented by a lane predictor 404 (hereinafter referred to as lane centeredness GVF) and the GVF implemented by a road angle predictor 406 (hereinafter referred to as road angle GVF) are implemented as separate neural networks that are implemented using one or more GPUs of the processor system 102 of vehicle control system 115. In some example embodiments, the set of predictors of the predictor sub-module 403 may be implemented as a single deep neural network. For example, the lane centeredness predictors 404 and the road angle predictors 406 may be implemented as a single deep neural network and may share the same inputs (e.g. current state $s_t$) and share one or more layers of the single deep neural network, such that the single deep neural network includes multiple diverging output branches for each prediction generated by the lane centeredness GVF implemented by a lane centeredness predictor 404 and for each prediction generated by the road angle GVF implemented by a road angle predictors 406. The lane centeredness and road angle GVF's implemented as neural networks can be trained using different methods. In an example embodiment, reinforcement learning (RL) is used to learn the parameters of the lane centeredness and road angle GVFs implemented by each lane centeredness predictor and each road angle predictors 404, 406 respectively. In some embodiments, the lane centeredness GVF and the road angle GVF may be implemented using another function approximation technique, as discussed further below. In general, a GVF may be defined as a function that predicts the expected future values of a cumulant (or pseudo-reward), based on a current state $s_t$, the vehicle action taken by the vehicle 105, and the next state (which is a result of the vehicle action taken by the vehicle 105). The cumulant is thus a prediction generated by the GVF. Using different discount factors γ enables the predictions to be generated for different time horizons. For example, a small discount factor applies a greater discounting of future values representing a shorter time horizon; whereas a larger discount factor applies a lesser discounting of future values representing a longer time horizon.

A lane centeredness GVF implemented by a lane centeredness predictor 404 may be represented as a function $f_{lane}$ that maps the current state $s_t \in S$, to future lane centeredness over different time horizons (represented by different values of γ, such as the values 0.5, 0.9, 0.95 and 0.97), forming the set of future lane centeredness predictions $P_{lane}$.

Similarly, a road angle GVF implemented by a road angle predictor 406 may be represented as a function $f_{angle}$ that maps the current state $s_t \in S$, to future road angles over different time horizons (represented by different values of γ, such as the values 0.5, 0.9, 0.95 and 0.97), forming the set of future road angle predictions $P_{angle}$.

The predictive perception module 402 outputs predictions 416 (also referred to as a predictive state), which may be in the form of a prediction vector containing the set of predictions of future lane centeredness predictions $P_{lane}$ and the set of future road angle predictions $P_{angle}$, at different time horizons. In some examples, the predictions 416 are concatenated together and may be further combined (e.g., concatenated) with the vehicle data 188 generated from information obtained from the vehicle sensors 111, and supplied to the controller 412.

The predictions 416 are inputted to the controller 412, which generates vehicle actions that aim to keep the vehicle 105 centered in the lane by using the set of predictions of future lane centeredness $P_{lane}$ and the set of future road angle predictions $P_{angle}$ to estimate (and potentially learn) the required adjustments to achieve the best lane centeredness over the long run. Generally, the controller 412 may be represented as a function $f_{control}$, that accepts the current state $s_t$ and the predictions 416 as input, and generates vehicle actions to be executed by the vehicle 105.

As noted above, the controller 412 may be a controller that was learned using RL, a controller that was learned using batch RL, or classical (e.g., PID) controller. Different approaches may be used to implement the controller 412. One approach is to build a classical controller, such as a PID controller, to steer the vehicle 105. The advantage of the controller 412 being a classic controller built to steer the vehicle 105 is that the behavior of the controller 412 can be tuned to keep the vehicle 105 centered in the lane. Another approach that may be used to implement the controller 412 is to define a reward and train the control behavior of the controller 412 using a policy gradient method or other RL method from the predictions 416 rather than directly from the digital images. In general, the controller 412 maps the set of predictions, and most recent (e.g. last) vehicle action to vehicle actions (i.e. control decision). This can be done using various suitable approaches, such as a rule-based approach, an expert system-based approach, or a learning-based approach with function approximation. The learning-based approach may be learned using DPG, with either a linear function approximator or a neural network, for example. One implementation of a learning-based approach is a learned deterministic policy gradient (DPG) approach with linear function approximation. In this approach, the predictions 416 may be used as error terms in a proportional controller; this means that a linear DPG controller learns the proportional coefficients automatically. Another approach may be to apply integral and derivative terms to each prediction 416 to implement a learned PID controller using DPG. This approach may require the state space to consist only of predictions of lane centeredness (i.e. lane centeredness predictions) and predictions of road angle predictions (i.e. road angle predictions), because these are error terms for the controller. If the input to the controller 412 includes vehicle data 188 generated from information obtained from the vehicle sensors 111, it may be preferable to use a non-linear function approximation approach for DPG. Other RL methods can be applied here to learn the controller policy for the controller 412.

Note that these function approximation techniques permit the controller 412 to be learned (or tuned in the case of a classical controller) after the parameters of the GVFs implemented by each predictor of the set of predictors of the predictor sub-module 403 are learned, because the GVF's implemented by each predictor of the set of predictors of the predictor sub-module 403 are learned off-policy and do not depend on the behavior of the controller 412. In other words, the GVFs implemented by each predictor of the set of predictors of the predictor sub-module 403 may be implemented using a first neural network (it should be noted that a lane centeredness GVF and the road angle GVF may be implemented as a single deep neural network) and the controller 412 may implement a second neural network. The first and second neural networks may be trained separately. In other examples, the parameters of the first neural network that implements each of the GVFs implemented by the set of predictors of the predictor sub-module 403 and the parameters of the second neural network implemented by controller 412 can be learned simultaneously. Regardless of the training approach used to train the predictive perception system 400, the set of predictors of the predictor sub-module 403 and controller 412 are independent modules that can be swapped out or retrained from new data either independently or together.

During training of the predictive perception system 400, cumulants for lane centeredness and road angle are used to train the lane predictors and road angle predictors 404, 406. Generally, the goal is to learn a predictor that predicts the return $G_t$ of a cumulant $c_t$ where:

$$G_t \equiv \sum_{k=0}^{\infty} \left( \prod_{j=0}^{k} \gamma_{t+j+1} \right) c_{t+k+1}$$

It may be noted that a similar method as that described in U.S. patent application Ser. No. 15/965,182, filed Apr. 27, 2018, entitled "METHOD AND SYSTEM FOR ADAPTIVELY CONTROLLING OBJECT SPACING" and incorporated herein by reference, may be used in the present disclosure to learn the predictors 404, 406 for lane centeredness and road angle, respectively, where the cumulant is replaced with $\alpha_t$ and $\beta_t$ respectively.

There may be many predictions of $\alpha_t$ and $\beta_t$ at different temporal horizons (e.g., as illustrated in FIG. 3). The set of temporal horizons for the respective predictions is given by $\Gamma_\alpha=\{\gamma_1^\alpha, \gamma_2^\alpha \ldots \gamma_{m_\alpha}^\alpha\}$ and $\Gamma_\beta=\{\gamma_1^\beta, \gamma_2^\beta \ldots \gamma_{m_\beta}^\beta\}$ respectively.

For ease of notation, the next few sections will be written as a set of functions, one for each prediction, denoted as $f_{\gamma 1}^\alpha(s), f_{\gamma 2}^\alpha(s), \ldots f_{\gamma m_\alpha}^\alpha(s)$ for each future lane centeredness prediction in the set of future lane centeredness predictions $P_{lane}$ and denoted as $f_{\gamma 1}^\beta(s), f_{\gamma 2}^\beta(s), \ldots f_{\gamma m_\beta}^\beta(s)$ for each future road angle in the set of future road angle predictions $P_{angle}$. Together, the set of future lane centeredness predictions $P_{lane}$ and the set of future road angle predictions $P_{angle}$ are the predictions 416. This notation permits the sharing of parameters when the lane predictor and road angle predictor sub-modules 404, 406 are implemented by a single deep neural network as described above.

The inputs (states) for each lane predictor 404 and road angle predictor 406 is the same, namely the current state $s_t$ determined by the state sub-module 410. The current state $s_t$ includes a current digital image of the environment received from the camera 112, one or more previous digital images of the environment received from the camera 112, linear speed of the vehicle 105 $v_t$, transmission gear, engine RPM, last action.

A predictive vector $e_t$ at time t is computed by concatenating all future lane centeredness predictions and future road angle predictions together into a prediction vector denoted $e_t = [f_{\gamma 1}^\alpha(s_t), \ldots f_{\gamma m_\alpha}^\alpha(s_t), f_{\gamma 1}^\beta(s_t), \ldots f_{\gamma m_\beta}^\beta(s_t)]$. A predictive state representation (also referred to as a predictive state vector) $p_t$ is given by the concatenation of the prediction vector $e_t$, the most recent (i.e. last) vehicle action $a_{t-1}$ and the vehicle data 188 received from the vehicle sensors 111 $\omega_t$. The predictions contained in the prediction vector evaluate the long term impact of following a fixed target policy $\pi(a|s)$ on lane centeredness $\alpha$ and road angle $\beta$. The predictive perception module 402 outputs the predictive state representation $p_t$ containing the predictions 416.

As previously noted, the controller 412 may implement a function $f_{control}(e_t, \omega_t, a_{t-1}) \rightarrow a_t$ of the prediction vector $e_t$, last action taken $a_{t-1}$ and the vehicle data 188 received from the vehicle sensors 111 $\omega_t \subset s_t$ like speed, gear and engine RPM (other higher dimensional sensor data 182 may optionally be included, such as LIDAR data). In other words, controller 412 may implement a learned function that maps the prediction vector, most recent (i.e. last) vehicle action taken $a_{t-1}$, the vehicle data 188 to a vehicle action (e.g., a vehicle action to change at last one of steering and speed of the vehicle 100) that should be performed. The function $f_{control}$, may be implemented as a neural network, a linear function approximator, or a PID controller.

An example of the function $f_{control}$ implemented as a PID controller is control described first. In this example, the controller 412 can be split into two PID controllers that each implement a $f_{control}$: a steering PID controller that implements a function $f_{steer}(e_t, \omega_t, a_{t-1})$ and a speed PID controller that implements a function $f_{speed}(e_t, \omega_t, a_{t-1})$. The steering PID controller is given by the policy function $\Delta a_{steering} = \pi_{steering}(e_t, \omega_t) = \theta_{steering}^T e_t$ where the integral and derivative terms are omitted for notational convenience and $\Delta a_{steering}$ is the change in steering, i.e. $a_t = \Delta a_{steering} + a_{t-1}$. The derivative terms are approximated with $e_t - e_{t-1}$ and the integral terms are approximated with $\Sigma_{i=0}^{m-1} e_{t-i}$. The parameters $\theta_{steering}$ are tuned manually to achieve the desired behavior. The speed PID controller may be implemented using, for example, a classical PID controller designed to achieve a target speed (e.g., a speed limit). The speed PID controller is thus independent of the generated set of predictions. It may be noted that the parameters $\theta_{steering}$ can be learned by DPG or other methods of RL, where one possible reward function is:

$$r_t = v_t \cos \beta_t$$

where $v_t$ is the speed of the vehicle. Other reward functions are possible as well to achieve the desired steering behavior. DPG requires two function approximators for the action-value function $Q^\pi(e_t, \omega_t, a_t)$ and the policy network $\pi(e_t, \omega_t)$ which outputs both desired steering angle and target speed. Both the action-value function and the policy network may be implemented using neural networks in general. The details of learning the policy network and value function are described in, for example, D. Silver et al. "Deterministic Policy Gradient Algorithms," in *Proc. Int. Conf. on International Conference on Machine Learning*, Beijing, China, 2014, and will not be described in detail here.

In some examples, the controller 412 may be a controller learned using RL (referred to hereinafter as a RL-based controller). The RL-based controller may be similar to the steering PID controller described above. However, the RL-based controller may provide a more general solution for steering control. Further, the RL-based controller may provide speed control based on the generated predictions.

As discussed above, the steering PID controller receives a set of predictions and learns (for example using DDPG) a linear steering policy $\pi_{steering}$ that outputs a vehicle action $a_t$ which is a steering control action. The steering control action contains control signals for changing steering of the vehicle 100.

A RL-based controller may enable implementation of a non-linear policy for steering control as well as for speed control. For example, a non-linear policy $\pi$ may be approximated (or modelled by) a RL-trained neural network (i.e. a neural network trained using a RL algorithm). Using RL, a policy may be learned to controls both steering and speed of the vehicle, based on the same set of predictions. How the policy is approximated (or modelled) by a neural network (compared to a linear function approximator) is a key difference along with the addition of speed command to the output of the policy in the RL embodiment. This RL-based controller may be may be learned using any RL algorithm, not limited to DDPG with a linear policy (which is an RL algorithm) to learn the policy. Further details of learning a RL-based controller will be discussed further below.

Figure 6A:
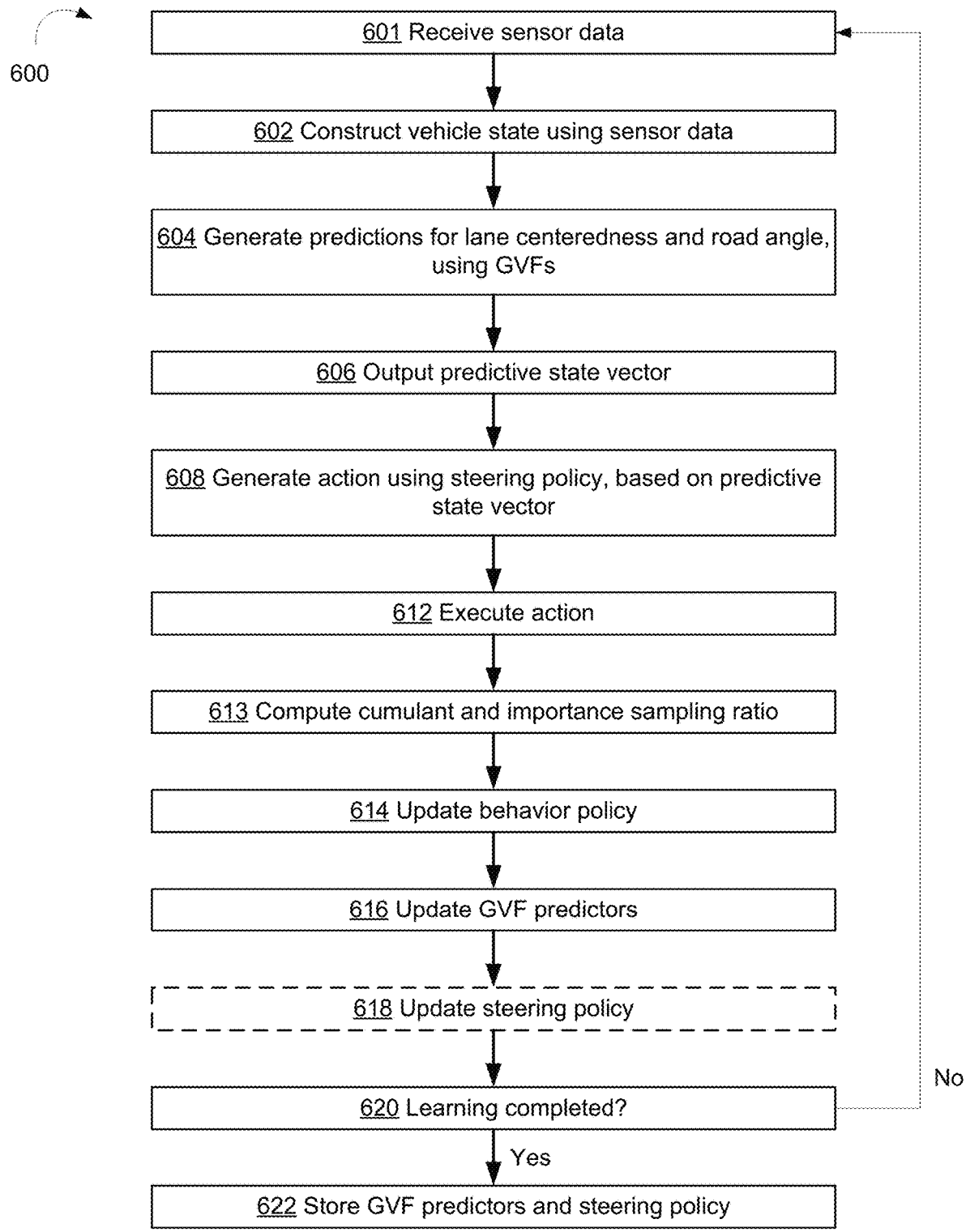
FIG. 6A is a flowchart of an example method for online training of the predictive control system of FIG. 4.

FIG. 6A is a flowchart illustrating an example method 600 for training the predictive control system 400. Some steps of the method 600 are performed by the predictive perception module 402 and the controller 412. The method 600 may be performed on an online basis (e.g., using actual operation of the vehicle 105, for example using a human or robot driver to interact with the environment).

For training the one or more lane centeredness predictors 404 (each of which implements a GVF $f_{lane}$) and the one or more road angle predictors 406 (each of which implements a GVF $f_{angle}$) the return function $G_t$ (as described previously) may be used, where the cumulants are $\alpha_t$ and $\beta_t$ respectively. The target policy $\tau(a|s)$ is followed. A separate behavior policy may be represented by a behavior distribution $\mu(a|s)$. The behavior policy may be approximated (or modelled) by a neural network (referred to hereinafter as a behavior network). It may be noted that the behavior policy may be random (e.g., for exploring the environment, in simulated training), or may be unknown (e.g., in the case where a human is performing the driving).

At 601, sensor data 182 is received (e.g., from the environmental sensors 110) and vehicle data 118 is obtained from information received from the vehicle sensors 111 at a current time step t. The sensor data 182 may be a digital image of the environment captured by the camera 112.

At 602, the state sub-module 410 determines the vehicle state $s_t$ at the current time t, using the sensor data 182. The state $s_t$ includes the digital image, one or more digital images received at previous times t−1, t−2, . . . , t−n, and a most recent (i.e. last) vehicle action taken by the vehicle 105. The most recent vehicle action is one of a steering control action, a speed control action, and a steering and speed control action.

At 604, a set of lane centeredness predictors 404 generate a set of future lane centeredness predictions $P_{lane}$, and a set of road angle predictors 406 generate a set of future road angle predictions $P_{angle}$, based on the determined current vehicle state $s_t$. In other words, each respective lane centeredness predictor 404 in the set of lane centeredness predictors generates a future lane centeredness prediction and each respective road angle predictor 406 in the set of road angle predictors generates a future road angle prediction. The set of future lane centeredness predictions $P_{lane}$ and the set of future road angle predictions $P_{angle}$ together form the predictive vector, which are included in the predictive state vector. Each lane centeredness predictor 404 implements a GVF that predicts a future accumulated cumulant value that represents the sum of future lane centeredness. Each road angle predictor 406 implements a GVF that predicts a future accumulated cumulant value that represents the sum of future road angles. Depending on the discount factor that is applied to values of future lane centeredness or future road angle, the GVF implemented by a lane centeredness predictor generates predictions over a different time horizon than the GVF implemented by a road angle predictor 406.

The future lane centeredness and the future road angle predictions are generated for the given current vehicle state $s_t$ for a predetermined set of time horizons. Mathematically, the set of future lane centeredness predictions may be written as $e_\gamma^\alpha = f_\gamma^\alpha(s_t, l_t)$, and the set of future road angle predictions may be written as $e_\gamma^\beta = f_\gamma^\beta(s_t, l_t)$ where $l_t$ denotes the target destination (e.g. lane) for one or more values of $\gamma$. For example, as discussed above, the set of time horizons may be $\Gamma_\alpha = \{\gamma_1^\alpha, \gamma_2^\alpha \ldots \gamma_{m_\alpha}^\alpha\}$ and $\Gamma_\beta = \{\gamma_1^\beta, \gamma_2^\beta \ldots \gamma_{m_\beta}^\beta\}$ for lane centeredness and road angle, respectively. For example, there may be at least two different time horizons for each set of predictions (i.e. for the set of future lane centeredness predictions and the set of future road angle predictions). It may be useful to have predictions for at least two different time horizons in each set of predictions, to enable smooth speed control. It should be noted that it may be sufficient to use only one time horizon to enable smooth steering control.

For simplicity, the values contained in $\Gamma_\alpha$ may be the same as the values contained in $\Gamma_\beta$, for example each set of time horizons may contain four values: {0.5, 0.9, 0.95 and 0.97}.

The target destination $l_t$ may be determined from target parameters (e.g., target lane position $\varphi$ where $\varphi=0$ represents the exact center of the lane; and target speed limit), that may be preset or provided as control input. The target lane position may be randomly walked, for training the predictive perception module 402.

At 606, a predictive state vector p is outputted by the predictive perception module 402. The predictive state vector contains the predictions 416. For example, the predictive state vector may be formed by a concatenation of $e_\gamma^\alpha$ and $e_\gamma^\beta$, such that $p=[e_{\gamma 1}^\alpha, \ldots e_{\gamma m_1}^\alpha, e_{\gamma 1}^\beta, \ldots e_{\gamma m_2}^\beta]$. In some example embodiments (e.g., in the case where the controller 412 implements a PID controller), the integral and derivative terms for the predictions may be calculated by the predictive perception module 402 and also stored in the predictive state vector p. In some example embodiments, some information included in the determined state $s_t$ may be included in the predictive state vector p such as the most recent (i.e. last) vehicle action taken and the current speed of the vehicle 105.

At 608, the controller 412 generates a vehicle action $a_t$, based on the received predictive state vector p. The vehicle action $a_t$ may be a steering control action, a speed control action, or a steering and speed control action. The vehicle action $a_t$ is generated using a steering policy $\pi_{steering}$ implemented by the controller 412.

At 612, the vehicle action $a_t$ is executed. For example, the vehicle action $a_t$ generated by the controller 412 may be outputted to be processed by the vehicle control system 115, in order to be executed by the drive control system 150. Execution of the vehicle action $a_t$ causes the vehicle 105 to interact with the environment. The next state $s_{t+1}$ at the next time step is observed (e.g., using the environmental sensors 110 and the vehicle sensors 111). The next state $s_{t+1}$ represents the outcome of executing the vehicle action $a_t$.

At 613, the outcome of the vehicle action $a_t$ is evaluated. This involves computing the cumulant $c_{t+1}$ based on the current state $s_t$, the executed vehicle action $a_t$, and the next state $s_{t+1}$. The cumulant may be conceptually understood as representing the current lane centeredness and road angle. The importance sampling ratio is also computed. The importance sampling ratio represents the weight (or "importance") of the data collected at this time step.

At 614, the behavior policy is updated. Example steps for updating the behavior policy are discussed with respect to the example pseudocode presented further below.

At 616, the GVFs implemented by each of the lane centeredness predictors 404 and the road angle predictors 406 is updated, for example using gradient descent. Example steps for updating a GVF implemented by a lane centeredness predictor 404 or a road angle predictor 406 are discussed with respect to the example pseudocode presented further below.

Optionally, at 618, the steering policy may also be updated. This may be performed only in cases where the steering policy is learned (e.g., using DDPG, Deep Q-Network (DQN), or other RL technique). This step may be omitted if the controller 412 does not implement a steering policy or if the steering policy is tuned manually, for example.

At 620, it is determined whether learning is completed. For example, a determination may be made whether a termination function satisfies a termination condition (e.g., the vehicle 105 reaches a target goal). If learning is not completed, the method 600 returns to step 601.

If learning is completed, then at 622 the updated GVF predictors and updated steering policy (if optional step 618 is performed) is stored.

Further details for learning the GVFs implemented by the set of predictors (e.g. the lane centeredness predictors 404 and the road angle predictors 406) and the controller policies are now described. Learning the GVFs implemented by the set of predictors, as described in the present disclosure, may be accomplished with reinforcement learning and GVFs (e.g., as described in either of the Silver et al. references previously mentioned). Each GVF predicts the future sum of discounted cumulants over a given time horizon when following a fixed policy $\tau$ over the given time horizon, where the given time horizon is defined by the discount factor. In constructing the GVF to predict speed, a cumulant (or pseudo-reward) function, pseudo-termination function, and target policy need to be defined. For constant values of the termination function, namely the discount factor $\gamma$ (also referred to herein as a time horizon), the time horizon for the prediction can be controlled via the relationship:

$$n_{\Delta t} = \frac{1}{1-\gamma}$$

where $n_{\Delta t}$ is an approximation of the number of time steps that a GVF predicts into the future. This is an approximation only and serves as a guideline.

The cumulant for predicting lane centeredness is:

$$c_t^{center} = \alpha_t(1-\gamma)$$

The correction factor $1-\gamma$ normalizes the sum of all future cumulants. The cumulant for predicting the road angle is:

$$c_t^{angle} = \beta_t(1-\gamma)$$

A target policy of $\tau(a_t|a_{t-1}) = N(a_{t-1}, \sigma^2)$ is used, where $N(.,.)$ is the normal distribution with mean $a_{t-1}$ and variance $\sigma^2$.

The present disclosure include description of pseudocode, which may be used to perform at least some steps of the disclosed example methods. For example, example pseudocode may represent computer-executable functions that may be used for learning the GVFs. In the example pseudocode described herein, the following notations are used:

$s_t$ is the observed state of the vehicle at time t;

$a_t$ is the executed vehicle action at time t, and $(s_t, a_t)$ forms a state action pair;

$\mu t(a|s)$ is the behavior policy distribution, which is considered to be unknown;

$\eta(a|s)$ is a probability density function for a distribution that is to be compared to the behavior distribution;

y is a class label indicating whether the vehicle action was sampled from $\mu(a|s)$ (y=1) or from $\eta(a|s)$ (y=0) for a given state;

g(a,s) is a discriminator that is learned, which distinguishes state action pairs from the two distributions $\mu(a|s)$ and $\eta(a|s)$, using the binary cross-entropy loss;

D is a set of replay data, also referred to as replay memory, used for RL training;

$c_t$ is the cumulant at time t (which may be the cumulant for predicting lane centeredness, or the cumulant for predicting road angle, as discussed above);

$\gamma_t$ is the time horizon, or continuation function, at time t, and is be a constant in non-episodic predictions;

$\hat{\mu}(a|s)$ is an estimate of g(a|s), computed by:

$$\hat{\mu}(a|s) = \frac{g(a,s)}{1-g(a,s)}\eta(a|s) \qquad \text{(equation 8)}$$

$\tau(a|s)$ is the target policy distribution;

$\rho_t$ is the importance sampling ratio;

$\theta$ is the set of parameters for the general value function;

$\hat{v}^\tau$ is the general value function, which is the expectation of $G_t$, and representing the total discounted cumulant at state s and under policy $\tau$.

Pseudocode 1

The following example pseudocode may be used for online out-of-policy training of the GVF implemented by each lane centeredness predictor 404 and each road angle predictor 406 and an RL steering control policy represented by $\pi(p)$, with unknown behavior policy distribution (represented by $\mu(a|s)$). Pseudocode 1 is as follows:

1. Initialize $\hat{v}^\tau$, g(a, s), $\pi(p)$, and replay memory D
2. Do until training completed
    2.1. Observe initial state $s_0$
    2.2. t = 0
    2.3. Do until episode terminated
        2.3.1. Construct predictive state vector $p_t$ from $\hat{v}^\tau(s_t)$ and $s_t$
        2.3.2. Sample vehicle action $a_t$ from a policy $\pi(p_t)$ with random exploration noise -continued 2.3.3. Execute vehicle action $a_t$ and observe next state $s_{t+1}$
2.3.4. Receive reward $r_{t+1}$
2.3.5 Compute cumulant $c_{t+1} = c(s_t, a_t, s_{t+1})$
2.3.6. Compute continuation $\gamma_{t+1} = \gamma(s_t, a_t, s_{t+1})$ 2.3.7. Estimate behavior density value with $\hat{\mu}(a_t | s_t) = \frac{g(a_t, s_t)}{1 - g(a_t, s_t)} \eta(a_t | s_t)$ 2.3.8. Estimate importance sampling ratio $\rho_t = \frac{\tau(a_t | s_t)}{\hat{\mu}(a_t | s_t)}$ 2.3.9. Store transition $(s_t, a_t, c_{t+1}, r_{t+1}, \gamma_{t+1}, s_{t+1}, \rho_t)$ in D
2.3.10. Compute the average importance sampling ratio in D as:

$\bar{\rho} = \frac{1}{|D|} \Sigma_{\forall i \in D} \rho_i$ 2.3.11. Sample random minibatch A of transitions $(s_t, a_t, c_{t+1}, \gamma_{t+1}, s_{t+1})$ from D
according to probability $\frac{\rho_i}{\Sigma_{\forall j \in A} \rho_j}$ 2.3.12. Compute $y_i = c_{t+1} + \gamma_{t+1} \hat{v}^\tau(s_{i+1}; \theta)$ for minibatch A
2.3.13. Update parameters using gradient descent for $\hat{v}^\tau(s_{i+1}; \theta)$ in minibatch A with the gradient $\nabla_\theta L(\theta) = \Sigma_{\forall i \in A} \bar{\rho}(\hat{v}^\tau(s_i; \theta) - y_i) \nabla_\theta \hat{v}^\tau(s_i; \theta)$
2.3.14. Sample random minibatch B of state action pairs $(s_i, a_i)$ from D according to uniform probability and assign label y = 1 to each pair
2.3.15. Randomly select half the samples in the minibatch B replacing the action with $a_t \sim \eta(a|s)$ and label with y = 0 and storing in $\hat{B}$
2.3.16. Update behavior discriminator g(a, s) using the binary cross-entropy loss with modified minibatch $\hat{B}$
2.3.17. Sample new random minibatch $B_2$ of transitions from D according to uniform probability
2.3.18. Update policy $\pi(p)$ with any RL algorithm for deterministic policies (e.g. DDPG, DQN, etc.)

The example pseudocode 1 may be used to perform the method 600 described above. For example, step 606 may be performed at line 2.3.1. of pseudocode 1, to construct the predictive state vector $p_t$ from the vehicle state $s_t$ and output of the GVF $\hat{v}^\tau(s_t)$. Step 608 may be performed at line 2.3.2. of pseudocode 1, to generate the action $a_t$ from the steering policy $\pi(p_t)$. Step 612 may be performed at line 2.3.3 of pseudocode 1, to execute the action $a_t$. Step 613 may be performed at lines 2.3.4 to 2.3.8, to compute the cumulant $c_{t+1}$ and importance sampling ratio $\rho_t$. Lines 2.3.9 and 2.3.10 of pseudocode 1 may also be performed as part of step 613. Step 614 may be performed at lines 2.3.14 to 2.3.16 of pseudocode 1, to update the behavior policy, by updating the behavior discriminator g(a,s). Step 616 may be performed at lines 2.3.11 to 2.3.13 of pseudocode 1, to update the GVF $\hat{v}^\tau$. It should be noted that steps 614 and 616 may be performed in a different order than that shown in FIG. 6A. For example, step 616 is performed before step 614 using pseudocode 1. Step 618 may be performed at lines 2.3.17 to 2.3.18 of pseudocode 1, to update the steering policy $\pi(p)$.

It should be noted that pseudocode 1 is provided only as an example, and is not intended to be limiting. For example, a modification of pseudocode 1 may be to remove line 2.3.10. Line 2.3.11 may then be modified to sample minibatch A according to a uniform random probability. The gradient in line 2.3.13 may then be replaced with $\nabla_\theta L(\theta) = \Sigma_{\forall i \in A} \rho_i (\hat{v}^\tau(s_i; \theta) - y_i) \nabla_\theta \hat{v}^\tau(s_i; \theta)$. Such a modification may result in higher variance in the gradients originally in line 2.3.13 of pseudocode 1.

Pseudocode 2

Another example pseudocode for online learning of out-of-policy GVFs is now described. This example pseudocode 2 may be suitable for the case where the behavior policy is known. For example, when the RL-based steering policy is stochastic, it is not necessary to estimate the behavior policy because the behavior policy is set to be the steering policy. Pseudocode 2 may be similar to pseudocode 1, but modified to omit learning of the behavior policy. Pseudocode 2 is as follows:

1. Initialize $\hat{v}^\tau(s)$, g(a, s), $\pi(a|p)$, and replay memory D
2. Do until training completed
    2.1. Observe initial state $s_0$
    2.2. t = 0
    2.3. Do until episode terminated
        2.3.1. Construct predictive state $p_t$ from $\hat{v}^\tau(s_t)$ and $s_t$
        2.3.2. Sample vehicle action $a_t$ from a policy $\pi(a_t|p_t)$
        2.3.3. Execute vehicle action $a_t$ and observe next state $s_{t+1}$
        2.3.4. Receive reward $r_{t+1}$
        2.3.5 Compute cumulant $c_{t+1} = c(s_t, a_t, s_{t+1})$
        2.3.6. Compute continuation $\gamma_{t+1} = \gamma(s_t, a_t, s_{t+1})$ 2.3.7. Estimate importance sampling ratio $\rho_t = \dfrac{\tau(a_t|s_t)}{\pi(a_t|p_t)}$ 2.3.8. Store transition $(s_t, a_t, c_{t+1}, \gamma_{t+1}, s_{t+1}, \rho_t)$ in D 2.3.9. Compute the average importance sampling ratio in D as $\bar{\rho} = \dfrac{1}{|D|}\Sigma_{\forall i \in D}\rho_i$ 2.3.10. Sample random minibatch A of transitions $(s_t, a_t, c_{t+1}, \gamma_{t+1}, s_{t+1})$ from D according to probability $\dfrac{\rho_i}{\Sigma_{\forall j \in A}\rho_j}$ 2.3.11. Compute $y_i = c_{i+1} + \gamma_{i+1}\hat{v}^\tau(s_{i+1}; \theta)$ for minibatch A
2.3.12. Update parameters using gradient descent for $\hat{v}^\tau(s_{i+1}; \theta)$ in minibatch A with the gradient $\nabla_\theta L(\theta) = \Sigma_{\forall i \in A}\bar{\rho}(\hat{v}^\tau(s_i; \theta) - y_i)\nabla_\theta \hat{v}^\tau(s_i; \theta)$
2.3.13. Sample random minibatch B of transitions from D according to uniform probability
2.3.14. Update policy $\pi(a|p)$ with any RL algorithm that is suitable for stochastic policies (e.g., proximal policy optimization (PPO), soft actor-critic (SAC), trust region policy optimization (TRPO), etc.)

The example pseudocode 2 may be used to perform the method 600 described above, omitting step 614 (since the behavior policy is known). For example, step 606 may be performed at line 2.3.1. of pseudocode 2, to generate the predictive state vector $p_t$ from the vehicle state $s_t$ and output of the GVF $\hat{v}^\tau(s_t)$. Step 608 may be performed at line 2.3.2. of pseudocode 2, to generate the action $a_t$ from the steering policy $\pi(p_t)$. Step 612 may be performed at line 2.3.3 of pseudocode 2, to execute the vehicle action $a_t$. Step 613 may be performed at lines 2.3.4 to 2.3.7, to compute the cumulant $c_{t+1}$ and importance sampling ratio $\rho_t$. Lines 2.3.8 and 2.3.9 of pseudocode 2 may also be performed as part of step 613. Step 616 may be performed at lines 2.3.10 to 2.3.12 of pseudocode 2, to update the GVF $\hat{v}^\tau$. Step 618 may be performed at lines 2.3.13 to 2.3.14 of pseudocode 2, to update the steering policy $\pi(p)$.

Similar to pseudocode 1, a modification of pseudocode 2 may be to remove line 2.3.9. Line 2.3.10 may then be modified to sample minibatch A according to a uniform random probability. The gradient in line 2.3.12 may then be replaced with $\nabla_\theta L(\theta) = \Sigma_{\forall i \in A}\rho_i(\hat{v}^\tau(s_i; \theta) - y_i)\nabla_\theta \hat{v}^\tau(s_i; \theta)$. Such a modification may result in higher variance in the gradients originally in line 2.3.12 of pseudocode 2.

Pseudocode 3

Another example pseudocode for online learning of out-of-policy GVFs is now described. This example pseudocode 3 may be suitable for the case where the steering policy is predefined (e.g., using a PID controller). Pseudocode 3 may be similar to pseudocode 1, but modified to omit learning of the steering policy. Pseudocode 3 is as follows:

1. Received predefined policy $\pi(p)$
2. Initialize $\hat{v}^\tau(s)$, $g(a, s)$, and replay memory D
3. Do until training completed
    3.1. Observe initial state $s_0$
    3.2. t = 0
    3.3. Do until episode terminated
        3.3.1. Construct predictive state $p_t$ from $\hat{v}^\tau(s_t)$ and $s_t$
        3.3.2. Sample vehicle action $a_t$ from a policy $\pi(p_t)$ with exploration noise
        3.3.3. Execute vehicle action $a_t$ and observe next state $s_{t+1}$
        3.3.4. Compute cumulant $c_{t+1} = c(s_t, a_t, s_{t+1})$
        3.3.5. Compute continuation $\gamma_{t+1} = \gamma(s_t, a_t, s_{t+1})$ 3.3.6. Estimate behavior density value with $\hat{\mu}(a_t|s_t) = \dfrac{g(a_t, s_t)}{1 - g(a_t, s_t)}\eta(a_t|s_t)$ 3.3.7. Estimate importance sampling ratio $\rho_t = \dfrac{\tau(a_t|s_t)}{\hat{\mu}(a_t|s_t)}$ 3.3.8. Store transition $(s_t, a_t, c_{t+1}, \gamma_{t+1}, s_{t+1}, \rho_t)$ in D 3.3.9. Compute the average importance sampling ratio in D as $\bar{\rho} = \dfrac{1}{|D|}\Sigma_{\forall i \in D}\rho_i$ 2.3.10. Sample random minibatch A of transitions $(s_t, a_t, c_{t+1}, \gamma_{t+1}, s_{t+1})$ from D according to probability $\dfrac{\rho_i}{\Sigma_{\forall j \in A}\rho_j}$ 3.3.11. Compute $y_i = c_{i+1} + \gamma_{i+1}\hat{v}^\tau(s_{i+1}; \theta)$ for minibatch A
        3.3.12. Update parameters using gradient descent for $\hat{v}^\tau(s_{i+1}; \theta)$ in minibatch A with the gradient $\nabla_\theta L(\theta) = \Sigma_{\forall i \in A}\bar{\rho}(\hat{v}^\tau(s_i; \theta) - y_i)\nabla_\theta \hat{v}^\tau(s_i; \theta)$ -continued 3.3.13. Sample random minibatch B of state vehicle action pairs $(s_i, a_i)$ from D according to uniform probability and assign label y = 1 to each pair
3.3.14. Randomly select half the samples in the minibatch B replacing the vehicle action with $a_i \sim \eta(a|s)$ and label with y = 0 and storing in $\hat{B}$
3.3.15. Update behavior discriminator g(a, s) using the binary cross-entropy loss with modified minibatch $\hat{B}$ The example pseudocode 3 may be used to perform the method 600 described above, with step 618 omitted (since the steering policy is predefined). For example, step 606 may be performed at line 3.3.1. of pseudocode 3, to construct the predictive state vector $p_t$ from the vehicle state $s_t$ and output of the GVF $\hat{v}^\tau(s_t)$. Step 608 may be performed at line 3.3.2. of pseudocode 3, to generate the action $a_t$ from the steering policy $\pi(p_t)$. Step 612 may be performed at line 3.3.3 of pseudocode 3, to execute the action $a_t$. Step 613 may be performed at lines 3.3.4 to 3.3.7, to compute the cumulant $c_{t+1}$ and importance sampling ratio $\rho_t$. Lines 3.3.8 and 3.3.9 of pseudocode 3 may also be performed as part of step 613. Step 614 may be performed at lines 3.3.13 to 3.3.15 of pseudocode 3, to update the behavior policy, by updating the behavior discriminator g(a,$). Step 616 may be performed at lines 3.3.10 to 3.3.12 of pseudocode 3, to update the GVF $\hat{v}^\tau$. It should be noted that steps 614 and 616 may be performed in a different order than that shown in FIG. 6A. For example, step 616 is performed before step 614 using pseudocode 3.

Similar to pseudocode 1, a modification of pseudocode 3 may be to remove line 3.3.9. Line 3.3.10 may then be modified to sample minibatch A according to a uniform random probability. The gradient in line 3.3.12 may then be replaced with $\nabla_\theta L(\theta) = \Sigma_{\forall i \in A} \rho_i(\hat{v}^\tau(s_i; \theta) - y_i) \nabla_\theta \hat{v}^\tau(s_i; \theta)$. Such a modification may result in higher variance in the gradients originally in line 3.3.12 of pseudocode 3.

In various examples, training data may be generated offline by a simulator, or a human driver, for example, to train the GVFs implemented by each lane centeredness predictor 404 and each road angle predictor 406. The training data should provide sufficient coverage of the state and vehicle action spaces in order for the trained GVFs to have good generalization. The GVFs may then be learned using offline out-of-policy training. By offline training, it is meant that the training data is generated offline (e.g., by a simulator, a robot or a human driver, for example) and is sampled in batches for training.

Figure 6B:
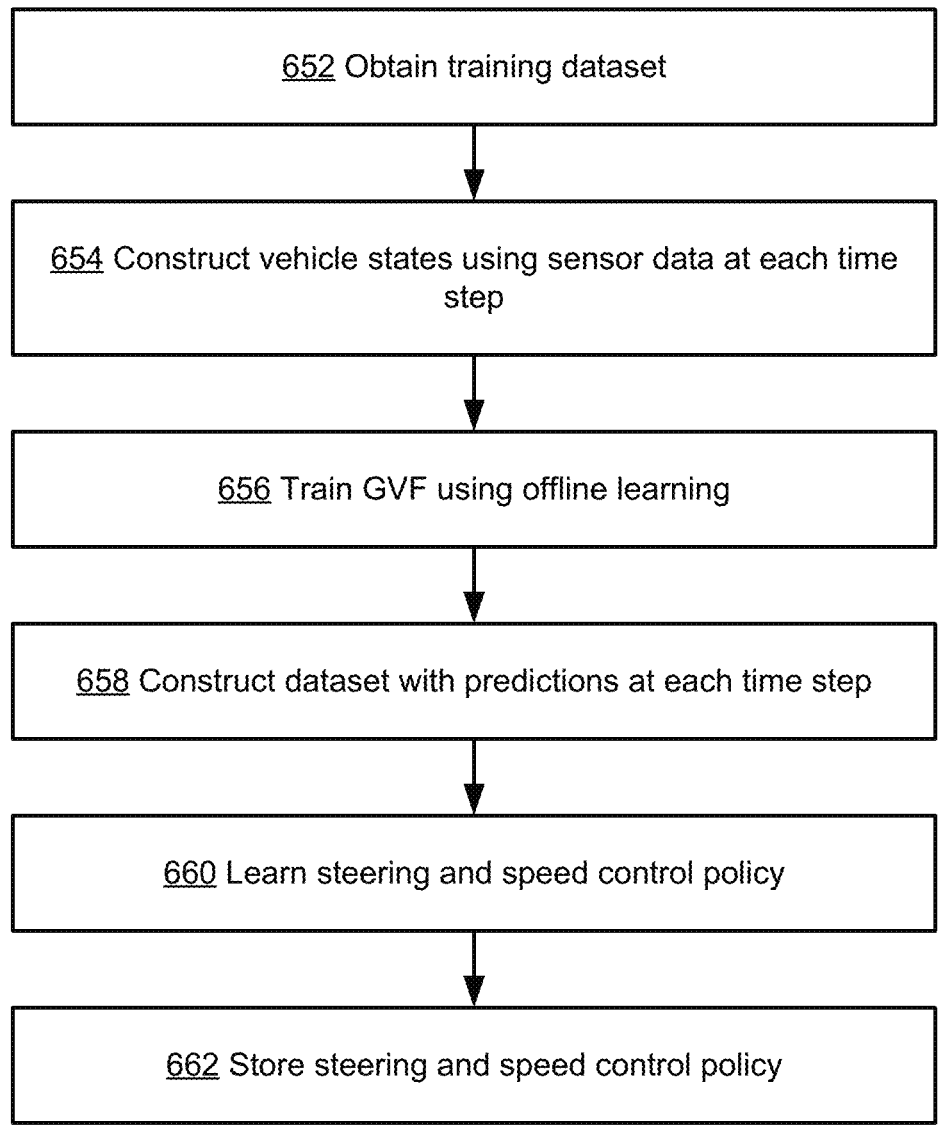
FIG. 6B is a flowchart of an example method for offline training of the predictive control system of FIG. 4.

FIG. 6B is a flowchart illustrating an example method 650 for training the predictive control system 400. Some steps of the method 650 are performed by the predictive perception module 402 and the controller 412. The method 650 may be performed on an offline basis (e.g., using a simulator or a workstation, with a previously collected training dataset).

At 652, a training dataset containing previously obtained data samples are received. For example, the training dataset may include data samples that were generated by a robot or human driver interacting with the environment, and may represent previous experience. In another example, the training dataset may include data samples that were generated by a simulator. Each data sample is a transition sample that contains a vehicle action, sensor data 182, and vehicle data 188.

At 654, the state sub-module 410 constructs the vehicle state at each time step, using sensor data and vehicle data of a data sample at the corresponding time step in a data sample included in the training dataset.

At 656, the GVFs implemented by the set of predictors of the predictor submodule 403 (i.e. the GVF implemented by each lane centeredness predictor 404 and the GVF implemented by each road angle predictor 406) are trained using offline learning. An example algorithm for offline learning of the predictor GVFs will be described further below.

At 658, a dataset is constructed containing the set of predictions generated by the GVFs implemented by the set of predictors (i.e., the GVF implemented by each lane centeredness predictor 404 and the GVF implemented by each road angle predictor 406) at each time step. The set of predictions at each time step may be represented by a predictive state vector.

At 660, the steering policy and speed control policy are learned for the controller 412. For example, the policies may be learned any suitable RL algorithm (e.g., similar to step 618 of method 600 described above).

At 662, the updated steering policy and speed control policy are stored.

Pseudocode 4

The following example pseudocode may be used for offline out-of-policy training of the GVFs implemented by the set of predictors in the predictors submodule 403, with an unknown behavior policy distribution. For example, the pseudocode 4 may be used to perform step 656 described above.

1. Received data file containing one or more trajectories
2. Initialize $\hat{v}^\tau$, g(a, s), and replay memory D
3. Do until training completed
    3.1. Observe initial state $s_0$ of the first episode in the data file
    3.2. t = 0
    3.3. Do until episode terminated
        3.3.1 Obtain vehicle action $a_t$ from unknown $\mu(a_t|s_t)$ recorded in the episode of the data file
        3.3.2. Obtain next state $s_{t+1}$ in the episode of the data file
        3.3.3. Compute cumulant $c_{t+1} = c(s_t, a_t, s_{t+1})$
        3.3.4. Compute continuation $\gamma_{t+1} = \gamma(s_t, a_t, s_{t+1})$ 3.3.5. Estimate behavior density value with $\hat{\mu}(a_t|s_t) = \frac{g(a_t, s_t)}{1 - g(a_t, s_t)} \eta(a_t|s_t)$ 3.3.6. Estimate importance sampling ratio $\rho_t = \frac{\tau(a_t|s_t)}{\hat{\mu}(a_t|s_t)}$ 3.3.7. Store transition $(s_t, a_t, c_{t+1}, \gamma_{t+1}, s_{t+1}, \rho_t)$ in D 3.3.8. Compute the average importance sampling ratio in $D$ as $\overline{\rho} = \frac{1}{|D|}\Sigma_{\forall i \in D}\rho_i$ 2.3.9. Sample random minibatch A of transitions $(s_t, a_t, c_{t+1}, \gamma_{t+1}, s_{t+1})$ from D according to probability $\frac{\rho_i}{\Sigma_{\forall j \in A}\rho_j}$ 3.3.10. Compute $y_i = c_{t+1} + \gamma_{t+1}\hat{v}^\tau(s_{i+1}; \theta)$ for minibatch A
3.3.11. Update parameters using gradient descent for $\hat{v}^\tau(s_{i+1}; \theta)$ in minibatch A with the gradient $\nabla_\theta L(\theta) = \Sigma_{\forall i \in A}\overline{\rho}(\hat{v}^\tau(s_i; \theta) - y_i)\nabla_\theta \hat{v}^\tau(s_i; \theta)$
3.3.12. Sample random minibatch B of state action pairs $(s_i, a_t)$ from D according to uniform probability and assign label y = 1 to each pair
3.3.13. Randomly select half the samples in the minibatch B replacing the vehicle action with $a_t \sim \eta(a|s)$ and label with y = 0 and storing in $\hat{B}$
3.3.14. Update behavior discriminator g(a, s) using the binary cross-entropy loss with modified minibatch $\hat{B}$ It should be noted that the above pseudocode is provided only as an example, and is not intended to be limiting. For example, a modification of pseudocode 4 may be to remove line 3.3.8. Line 3.3.9 may then be modified to sample minibatch A according to a uniform random probability. The gradient in line 3.3.11 may then be replaced with $\nabla_\theta L(\theta) = \Sigma_{\forall i \in A}\rho_i(\hat{v}^\tau(s_i; \theta) - y_i)\nabla_\theta \hat{v}^\tau(s_i; \theta)$. Such a modification may result in higher variance in the gradients originally at line 3.3.11 of pseudocode 4.

It should be noted that, even after the GVFs implemented by the set of predictors of the predictor submodule 403 have been trained, as described above, further training and improvements may be continued (e.g., in real-time, together with deployment).

Figure 7:
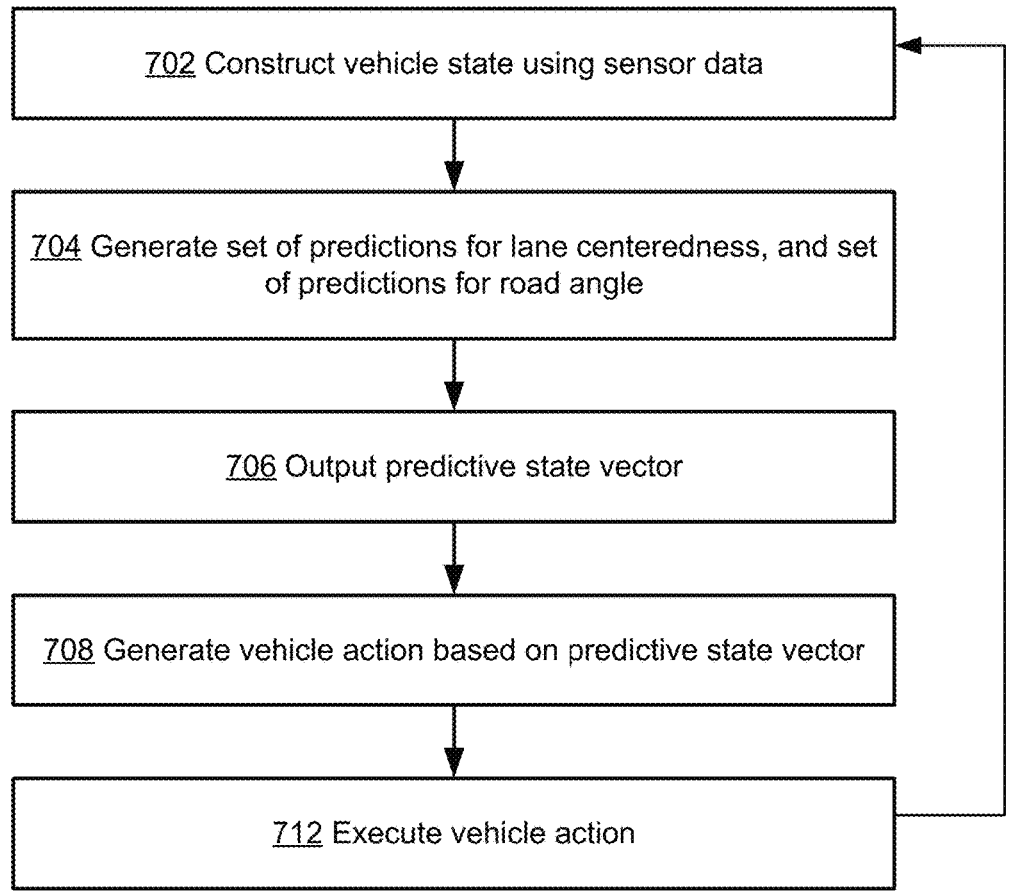
FIG. 7 is a flowchart of an example method for implementing vehicle control using the predictive control system of FIG. 4.

FIG. 7 is a flowchart illustrating an example method 700 for deployment of the trained predictive control system 400. As previously mentioned, the predictive control system 400 may be continuously trained (e.g., in real-time) while deployed. In such cases, the method 600 may be performed intermittently with the method 700, to update the predictive control system 400 during deployment. The method 700 may be performed by the trained predictive control system 400 in the vehicle 105, for example when the vehicle 105 is operating in autonomous or semi-autonomous mode. The method 700 may be performed repeated by the predictive control system 400 during deployment, for example at time intervals of every 100 ms or every 50 ms, to enable continuous predictive control of the vehicle 105.

It should be noted that some steps of the method 700 may be similar or identical to corresponding steps of the method 600. For ease of reference, the steps of the method 700 have been numbered in a manner similar to the steps of the method 600.

At 702, the state sub-module 410 determines the state $s_t$ at the current time t, using sensor data gathered from the sensors 110 (in particular, a digital image received from the camera(s) 112, and vehicle data obtained from information received from the vehicle sensors 111).

At 704, a set of lane centeredness predictors 404 generate a set of future lane centeredness predictions $P_{lane}$, and a set of road angle predictors 406 generates a set of future road angle predictions $P_{angle}$, based on the determined current state $s_t$. This is similar to step 604 described previously, and the details will not be repeated here. In deployment, the target lane position may be set at $\varphi=0$ (i.e., the center of the lane), possibly with some permitted deviation or drift (e.g., to account for potholes or other lane obstructions).

At 706, the predictive state vector p is outputted by the predictive perception module 402. The predictive state vector contains the predictions 416. For examples where the controller 412 implements a PID controller, the integral and derivative terms for the predictions may be computed by the predictive perception module 402 and also stored in the predictive state vector p.

At 708, the controller 412 generates a vehicle action $a_t$, based on the received predictive state vector p. The vehicle action $a_t$ may be a steering control action, a speed control action, or a steering and speed control action. The vehicle action includes control signals for controlling the steering and target speed.

At 712, the vehicle action $a_t$ is executed. For example, the vehicle action generated by the controller 412 may be outputted to be processed by the vehicle control system 115, in order to be executed by the drive control system 150. The drive control system 150 in turn generates control signals for actuating the electromechanical system 190, to enable the vehicle 105 to perform the actions.

The method 700 may then return to step 702.

In some example embodiments, the method 700 may be adapted for use with non-autonomous driving (e.g., by omitting the step 712). For example, the predictive control system 400 may be used in a passive warning system that generates warnings for actual or predicted lane departure and/or to indicate a need to slow down for an upcoming sharp turn.

In various examples, the present disclosure describes methods and systems that provides predictive steering control (and optionally speed control) using digital images (and basic sensor data) as input. The speed controller enables the vehicle to slow down before an anticipated sharp turn. Generation of a set of predictions (e.g., using learned GVFs) enables the controller to understand the upcoming road curvature in a compact representation. In addition, the GVFs are learned off-policy, in some examples using a behavior policy probability density estimation which permits data to be collected from real-world human driver conditions.

Examples described herein may be implemented in real-world applications. The predictors may be capable of learning features that enable the predictors to generalize to unseen roads with or without lane markings, because the relevant features may be learned automatically from the sensor data (e.g., digital images).

The present disclosure provides examples methods and systems that enable steering control of a vehicle (including controlling the speed of the vehicle around corners) using only digital images about the surrounding environment of the vehicle. The predictors may be learned off-policy, with a deep estimation of the behavior distribution. Further, the controller for controlling the vehicle steering and speed may be learned end-to-end with off-policy predictions and using DPG as described above. Other approaches for learning may be used.

In various examples described herein, learning the set of predictors and controller may be performed in a simulated environment or in a real-world environment. For example, DDPG-style exploration with an Ornstein-Uhlenbeck process may be used to explore the space of possible actions and states, in a simulated environment. A controller learned in the simulated environment may then be used for real-world deployment. In some examples, the predictor GVFs may be learned in a simulated environment, may be learned in a real-world environment, or a combination of the two. Any suitably safe behavior policy may be used for safe exploration of the real-world environment, for off-policy learning of the GVFs.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, GPUs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for predictive control of an autonomous vehicle, the method comprising:

receiving a digital image representing an environment of the autonomous vehicle and vehicle data representing a speed of the vehicle;

determining a current state of the autonomous vehicle and the environment of the autonomous vehicle, the current state being a set of data that includes the digital image and the vehicle data;

generating, using a respective set of lane centeredness general value functions (GVFs), a first set of predictions representing future lane centeredness of the vehicle over a set of respective multiple future time horizons, the first set of predictions being generated by the respective set of lane centeredness GVFs based on only the digital image and the vehicle data in the current state;

generating, using a respective set of road angle GVFs, a second set of predictions representing future road angle of the vehicle over the same or different set of respective multiple future time horizons, the second set of predictions being generated by the respective set of road angle GVFs based on only the digital image and the vehicle data in the current state;

wherein the respective set of lane centeredness GVFs is implemented using at least one neural network and maps the digital image and the vehicle data in the current state to the first set of predictions over the set of respective multiple future time horizons;

wherein the respective set of road angle GVFs is implemented using the same at least one neural network or at least one other neural network and maps the digital image and the vehicle data in the current state to the second set of predictions over the same or different set of respective multiple future time horizons; and generating, based on the first set of predictions over the set of respective multiple future time horizons and the second set of predictions over the same or different set of respective multiple future time horizons, a vehicle action.

2. The method of claim 1, further comprising learning the respective set of lane centeredness GVFs and the respective set of road angle GVFs by:

generating the first set of predictions by the respective set of lane centeredness GVFs based on the current state at a current time step and generating the second set of predictions by the respective set of road angle GVFs based on the current state at the current time step;

generating the vehicle action based on the first and second sets of predictions;

executing the vehicle action and sampling a next state at a next time step;

computing a cumulant based on the current state, the executed vehicle action and the next state; and updating the respective set of lane centeredness GVFs and the respective set of road angle GVFs implemented based on the cumulant.

3. The method of claim 1, further comprising learning the respective set of lane centeredness GVFs and the respective set of road angle GVFs by:

receiving a dataset containing vehicle action, digital images and vehicle data at respective time steps;

determining a state at each respective time step that includes the digital image and vehicle data at each respective time step; and updating the respective set of lane centeredness GVFs and the respective set of road angle GVFs based on cumulants computed using the vehicle action and state at each respective time step.

4. The method of claim 1, wherein the generated vehicle action is one of a steering control action to change a steering angle of the vehicle, a speed control action to change a target speed of the vehicle, and a steering and speed control action to change both a steering angle and a target speed of the vehicle.

5. The method of claim 1, wherein the vehicle action is generated by a predefined proportional-integral-derivative (PID) controller.

6. The method of claim 1, wherein the vehicle action is generated by a controller using reinforcement learning (RL).

7. The method of claim 1, wherein the respective set of lane centeredness GVFs and the respective set of road angle GVFs are implemented together as a single neural network.

8. A vehicle control system for controlling an autonomous vehicle, the vehicle control system comprising:
a processor system configured to execute instructions of a predictive control system to cause the predictive control system to:
receive a digital image representing an environment of the autonomous vehicle and vehicle data representing speed of the vehicle;
determine a current state of the autonomous vehicle and the environment of the vehicle, the current state being a set of data that includes the digital image and the vehicle data;
generate, using a respective set of lane centeredness general value functions (GVFs), a first set of predictions representing future lane centeredness of the vehicle over a set of respective multiple future time horizons, the first set of predictions being generated by the respective set of lane centeredness GVFs based on only the digital image and the vehicle data in the current state;
generate, using a respective set of road angle GVFs, a second set of predictions representing future road angle of the vehicle over the same or different set of respective multiple future time horizons, the second set of predictions being generated by the respective set of road angle GVFs based on only the digital image and the vehicle data in the current state;
wherein the respective set of lane centeredness GVFs is implemented using at least one neural network that and maps the digital image and the vehicle data in the current state to the first set of predictions over the set of respective multiple future time horizons;
wherein the respective set of road angle GVFs is implemented using the same at least one neural network or at least one other neural network and maps the digital image and the vehicle data in the current state to the second set of predictions over the same or different set of respective multiple future time horizons; and
generate, based on the first set of predictions over the set of respective multiple future time horizons and the second set of predictions over the same or different set of respective multiple future time horizons, a vehicle action.

9. The vehicle control system of claim 8, wherein the processor system is further configured to execute instructions to learn the respective set of lane centeredness GVFs and the respective set of road angle GVFs by:
generating the first set of predictions by the respective set of lane centeredness GVFs based on the current state at a current time step and generating the second set of predictions by the respective set of road angle GVFs based on the current state at the current time step;
generating the vehicle action based on the first and second sets of predictions;
executing the vehicle action and sampling a next state at a next time step;
computing a cumulant based on the current state, the executed vehicle action and the next state; and
updating the respective set of lane centeredness GVFs and the respective set of road angle GVFs implemented based on the cumulant.

10. The vehicle control system of claim 8, wherein the processor system is further configured to execute instructions to learn the respective set of lane centeredness GVFs and the respective set of road angle GVFs by:
receiving a dataset containing vehicle actions, digital images, and vehicle data at respective time steps;
constructing a state at each respective time step that includes the digital image and vehicle data at each respective time step; and
updating the respective set of lane centeredness GVFs and the respective set of road angle GVFs based on cumulants computed using the vehicle action and state at each respective time step.

11. The vehicle control system of claim 8, wherein the generated vehicle action is one of a steering control action to change steering angle of the vehicle, a speed control action to change a target speed of the vehicle, and a steering and speed control action to change both a steering angle and a target speed of the vehicle.

12. The vehicle control system of claim 8, wherein the vehicle action is generated by a predefined proportional-integral-derivative (PID) controller.

13. The vehicle control system of claim 8, wherein the vehicle action is generated by a controller that is learned using reinforcement learning (RL).

14. The vehicle control system of claim 8, wherein the respective set of lane centeredness GVFs and the respective set of road angle GVFs are implemented together as a single neural network.

15. A non-transitory computer-readable medium comprising computer-executable instructions that, when executed by a processor of a vehicle control system, cause the vehicle control system to:
receive a digital image representing an environment of the autonomous vehicle and vehicle data representing speed of the vehicle;
determine a current state of the autonomous vehicle and the environment of the vehicle, the current state being a set of data that includes the digital image and the vehicle data;
generate, using a respective set of lane centeredness general value functions (GVFs), a first set of predictions representing future lane centeredness of the vehicle over a set of respective multiple future time horizons, the first set of predictions being generated by the respective set of lane centeredness GVFs based on only the digital image and the vehicle data in the current state;
generate, using a respective set of road angle GVFs, a second set of predictions representing future road angle of the vehicle over the same or different set of respective multiple future time horizons, the second set of predictions being generated by the respective set of road angle GVFs based on only the digital image and the vehicle data in the current state;
wherein the respective set of lane centeredness GVFs is implemented using at least one neural network and maps the digital image and the vehicle data in the current state to the first set of predictions over the set of respective multiple future time horizons;

wherein the respective set of road angle GVFs is implemented using the same at least one neural network or at least one other neural network and maps the digital image and the vehicle data in the current state to the second set of predictions over the same or different set of respective multiple future time horizons; and generate, based on the first set of predictions over the set of respective multiple future time horizons and the second set of predictions over the same or different set of respective multiple future time horizons, a vehicle action.

16. The non-transitory computer-readable medium of claim 15, comprising further computer-executable instructions that, when executed by a vehicle control system cause the vehicle control system to learn the respective set of lane centeredness GVFs and the respective set of road angle GVFs by:

generating the first set of predictions by the respective set of lane centeredness GVFs based on the current state at a current time step and generating the second set of predictions by the respective set of road angle GVFs based on the current state at the current time step;

generating the vehicle action based on the first and second sets of predictions;

executing the vehicle action and sampling a next state at a next time step;

computing a cumulant based on the current state, the executed vehicle action and the next state; and updating the respective set of lane centeredness GVFs and the respective set of road angle GVFs implemented based on the cumulant.

17. The non-transitory computer-readable medium of claim 15, comprising further computer-executable instructions that, when executed by a vehicle control system cause the vehicle control system to learn the respective set of lane centeredness GVFs and the respective set of road angle GVFs by:

receiving a dataset containing vehicle actions, digital images, and vehicle data at respective time steps;

constructing a state at each respective time step that includes the digital image and vehicle data at each respective time step; and updating the respective set of lane centeredness GVFs and the respective set of road angle GVFs based on cumulants computed using the vehicle action and state at each respective time step.

18. The non-transitory computer-readable medium of claim 15, wherein the generated vehicle action is one of a steering control action to change a steering angle of the vehicle, a speed control action to change a target speed of the vehicle, and a steering and speed control action to change both a steering angle and a target speed of the vehicle.

19. The non-transitory computer-readable medium of claim 15, wherein the vehicle action is generated by a predefined proportional-integral-derivative (PID) controller.

20. The non-transitory computer-readable medium of claim 15, wherein the vehicle action is generated by a controller using reinforcement learning (RL).

* * * * *